United States Patent
Rune et al.

(10) Patent No.: US 11,026,210 B2
(45) Date of Patent: Jun. 1, 2021

(54) PAGING WITH POLLING OF UE ID LIST

(71) Applicant: Telefonaktiebolaget LM Ericsson (publ), Stockholm (SE)

(72) Inventors: Johan Rune, Lidingö (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 17 days.

(21) Appl. No.: 16/477,598

(22) PCT Filed: Dec. 21, 2017

(86) PCT No.: PCT/IB2017/058316
§ 371 (c)(1),
(2) Date: Jul. 12, 2019

(87) PCT Pub. No.: WO2018/130896
PCT Pub. Date: Jul. 19, 2018

(65) Prior Publication Data
US 2019/0342854 A1    Nov. 7, 2019

Related U.S. Application Data

(60) Provisional application No. 62/446,689, filed on Jan. 16, 2017.

(51) Int. Cl.
*H04W 76/11*    (2018.01)
*H04W 68/02*    (2009.01)
(Continued)

(52) U.S. Cl.
CPC ......... *H04W 68/02* (2013.01); *H04W 68/005* (2013.01); *H04W 72/046* (2013.01);
(Continued)

(58) Field of Classification Search
CPC ..................................................... H04W 68/02
See application file for complete search history.

(56) References Cited

U.S. PATENT DOCUMENTS

2008/0268878 A1*  10/2008  Wang ............... H04W 68/00
                                                       455/458
2011/0201361 A1*  8/2011  Montojo ............. H04L 5/0053
                                                       455/458
(Continued)

FOREIGN PATENT DOCUMENTS

EP    2 170 007 A1    3/2010

OTHER PUBLICATIONS

3GPP TSG-RAN WG2 Meeting #96; Reno, USA; Source: Nokia, Alcatel-Lucent Shanghai Bell; Title: Paging in NR at HF Operation (R2-168124)—Nov. 14-18, 2016.
(Continued)

Primary Examiner — John D Blanton
(74) Attorney, Agent, or Firm — Baker Botts, LLP

(57) ABSTRACT

A method in a network node (115) comprises determining (208, 304) to page one or more user equipments (UEs) (115). The method comprises transmitting (214, 308) a paging indicator associated with the one or more UEs. The method comprises receiving (218, 312), in response to the transmitted paging indicator, a predefined uplink signal from at least one of the one or more UEs. The method comprises sending (220, 316), in response to the received predefined uplink signal, a downlink message for initiating an exchange and verification of one or more paging identities, wherein each of the one or more paging identities is uniquely associated with one of the one or more UEs.

25 Claims, 10 Drawing Sheets

(51) Int. Cl.
    *H04W 68/00*     (2009.01)
    *H04W 72/04*     (2009.01)
    *H04W 74/08*     (2009.01)
    *H04W 88/02*     (2009.01)
    *H04W 88/10*     (2009.01)

(52) U.S. Cl.
    CPC ........ *H04W 74/0833* (2013.01); *H04W 76/11* (2018.02); *H04W 88/023* (2013.01); *H04W 88/10* (2013.01)

(56) References Cited

U.S. PATENT DOCUMENTS

| | | | |
|---|---|---|---|
| 2014/0128082 A1* | 5/2014 | Chirayil | H04W 36/38 |
| | | | 455/438 |
| 2016/0360516 A1 | 12/2016 | Karout et al. | |
| 2017/0367069 A1 | 12/2017 | Agiwal et al. | |
| 2018/0242306 A1* | 8/2018 | Wong | H04W 72/0413 |

OTHER PUBLICATIONS

PCT International Search Report for International application No. PCT/IB2017/058316—Mar. 13, 2018.

PCT Written Opinion of the International Searching Authority for International application No. PCT/IB2017/058316—Mar. 13, 2018.

\* cited by examiner

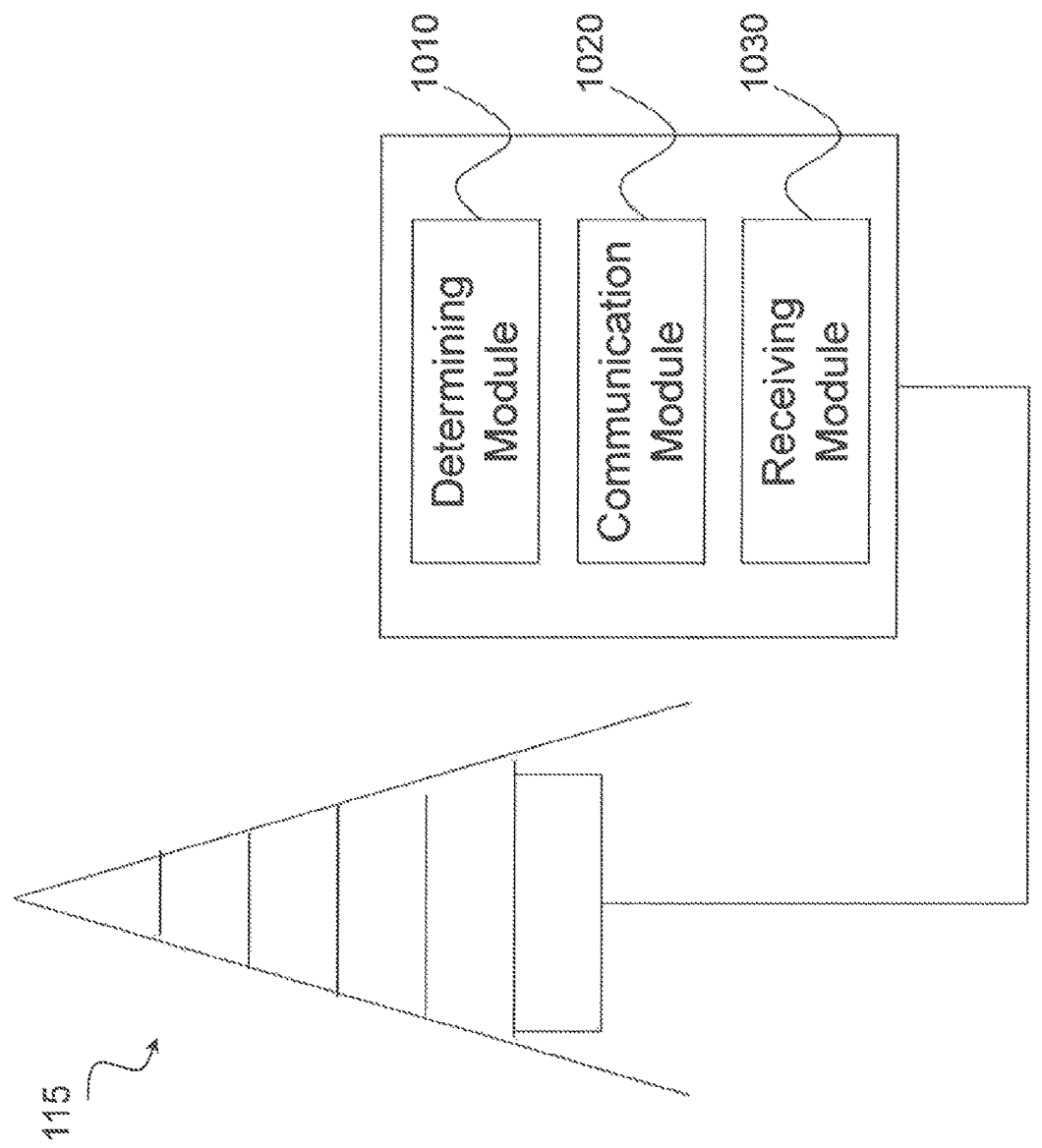

PAGING WITH POLLING OF UE ID LIST

PRIORITY

This nonprovisional application is a U.S. National Stage Filing under 35 U.S.C. § 371 of International Patent Application Serial No. PCT/IB2017/058316 filed Dec. 21, 2017 and entitled "Paging with Polling of UE ID List" which claims priority to U.S. Provisional Patent Application No. 62/446,689 filed Jan. 16, 2017 both of which are hereby incorporated by reference in their entirety.

TECHNICAL FIELD

The present disclosure relates, in general, to wireless communications and, more particularly, to paging of wireless devices.

BACKGROUND

In Long Term Evolution (LTE), a user equipment (UE) in RRC_IDLE state camps on a cell and, while camping, monitors the paging channel associated with that cell. The UE is configured to monitor repeatedly-occurring paging occasions, and may reside in a discontinuous reception (DRX) sleep mode in between the paging occasions. When the UE is paged at such a paging occasion, the paging is indicated on the Physical Downlink Control Channel (PDCCH) in the form of a downlink (DL) scheduling allocation addressed to the Paging Radio Network Temporary Identifier (P-RNTI) (which is shared by all UEs). This DL scheduling allocation indicates the DL transmission resources on the Physical Downlink Shared Channel (PDSCH) where the actual paging message is transmitted. A UE in RRC_IDLE state that receives a DL scheduling allocation addressed to the P-RNTI at one of the UE's paging occasions receives and reads the paging message from the allocated DL transmission resources to find out whether the paging message is intended for the UE. The one or more UEs that are subject to the paging are indicated in the paging message through one or more UE paging identifiers (e.g., SAE-Temporary Mobile Subscriber Identity (S-TMST) or International Mobile Subscriber Identity (IMSI)). In the paging message, each UE paging identifier is included in a paging record. Up to 16 UEs may be addressed (i.e., there may be up to 16 paging records in one paging message).

At the $3^{rd}$ Generation Partnership Project (3GPP) RAN2#95 meeting, companies have agreed that in New Radio (NR) at least one Radio Resource Control (RRC) state for low activity should meet the NR cyclic prefix (CP) latency requirement and must be capable of achieving comparable power efficiency to that of LTE's IDLE state.

In RAN2#95, it has also been agreed that for a UE in the "new state" (referred to herein as "RRC CONNECTED INACTIVE" or simply "inactive" state, although a formal name is yet to be defined), a Radio Access Network (RAN)-initiated notification procedure should be used to reach the UE. Additionally, the associated notification-related parameters should be configured by the RAN itself. The idle mode paging procedure, or relevant parts thereof, may be reused for the RAN-initiated UE notifications.

A noteworthy property of 5G/NR is that it is expected to be deployed in a wide range of frequency bands. Many of these bands have such high frequencies that the propagation and antenna properties are such that beamforming (i.e., focusing the radiated power (or focusing the receiver sensitivity) in a certain direction) is expected to be an important aspect to take into account. For instance, in the high frequency bands, many DL signals, such as paging and/or notification signals, that need to cover a certain area (i.e., not just targeting a single LIE with a known location and direction), such as a cell, are expected to be transmitted using beam sweeping. Beam sweeping involves transmitting the signal in one beam at a time, sequentially changing the direction and coverage area of the beam until the entire intended coverage area (e.g., the cell) has been covered by the transmission.

The beam sweep method of transmitting DL signals creates significant overhead due to the required repetitions of the signal. A contribution to the RAN2™96 meeting R2-168124 ("Paging in NR at HF operation") points out that beam sweeping of paging is inefficient from a resource perspective. This is due to the overhead inherently associated with beam sweeping. This is more pronounced as the number of beams in the sweep, and the number of UEs addressed with the same paging message, increases. Additionally, paging of a UE may be performed in a large number of cells, while the paged UE typically will be present to receive the page in at most one of the cells. Depending on the outcome of the standardization, it may be the case that a UE may use so-called dual camping, referring to a UE that simultaneously camps on cells of two radio access technologies (RATs) (e.g., NR and LTE) and monitors their respective paging channels. In such a case, the UE could potentially be paged in both NR and LTE simultaneously and could thus potentially receive the page in two cells, one NR cell and one LTE cell.

To combat this wastefulness, it was proposed in R2-168124 to only transmit a paging indicator (instead of a full list of paging records) that addresses a subset of all UEs. A UE that receives its allocated paging indicator contacts the network and provides its paging identity. The network (e.g., gNB) compares the received paging identity with its list of paging identities of UEs to be paged in that paging occasion and, if a match is found, the network node responds to the UE using dedicated transmission. If the UE's paging identity does not match any of the paging identities in the list, R2-168124 proposes that the gNB optionally can respond with a negative indication (referred to as a "false paging indication").

R2-168124 points out relevant issues—that it is wasteful to sweep paging messages in narrow beams, potentially in many cells and that, in case a single UE is being paged, these transmissions are redundant in all but one (or even all) of the cells. The response driven approach proposed in R2-168124 thus saves a lot of DL signaling and reduces the network energy consumption. On the other hand, this is achieved at the expense of a higher load on the UEs and the uplink (UL). Thus, there is a need for an improved method of paging.

SUMMARY

To address the foregoing problems with existing solutions, disclosed is a method in a network node. The method comprises determining to page one or more user equipments (UEs). The method comprises transmitting a paging indicator with the one or more UEs. The method comprises receiving, in response to the transmitted paging indicator, a predefined uplink signal from at least one of the one or more UEs. The method comprises sending, in response to the received predefined uplink signal, a downlink message for initiating an exchange and verification of one or more paging identities, wherein each of the one or more paging identities is uniquely associated with one of the one or more UEs.

In certain embodiments, the downlink message for initiating the exchange and verification of one or more paging identities may comprise the one or more paging identities.

In certain embodiments, the downlink message for initiating the exchange and verification of one or more paging identities may comprise an uplink grant enabling a first UE of the one or more UEs to provide a first paging identity uniquely associated with the first UE. The method may comprise receiving the first paging identity from the first UE, and comparing the received first paging identity to a list of paging identities of one or more UEs to be paged.

In certain embodiments, the method may further comprise allocating the paging indicator to the one or more UEs prior to determining to page the one or more UEs.

In certain embodiments, the paging indicator may comprise a set of bits that is the same as a subset of bits of each of the one or more paging identities uniquely associated with one of the one or more UEs. In certain embodiments, the paging indicator may further comprise a field indicating one or more of: a length of the paging indicator; and a format of the paging indicator.

In certain embodiments, sending the downlink message may comprise determining one or more directions from which the predefined uplink signal was received from the at least one of the one or more UEs, and distributing transmitted power in the determined one or more directions.

In certain embodiments, transmitting the paging indicator may comprise transmitting multiple transmissions of the paging indicator. In certain embodiments, each of the multiple transmissions may be transmitted in a different direction. In certain embodiments, the multiple transmissions may be beam formed.

In certain embodiments, the predefined uplink signal may be a Physical Random Access Channel (PRACH) preamble.

In certain embodiments, the method may comprise receiving, from another network node, a request to page the one or more UEs.

In certain embodiments, the downlink message may further comprise downlink data intended for a first UE of the one or more UEs. The method may further comprise determining whether to transmit downlink data for the first UE in the downlink message based on a traffic load in a cell where the downlink message will be transmitted.

In certain embodiments, the method may further comprise determining whether to transmit the paging indicator to the one or more UEs based on one or more of: a capability of the one or more UEs; a category of the one or more UEs; and information related to subscription data associated with the one or more UEs.

In certain embodiments, the method may further comprise configuring at least one of the one or more UEs with a minimum length of a received paging indicator that the UE should accept as an indication that the UE is one of the one or more UEs targeted by the paging indicator.

Also disclosed is a network node. The network node comprises a receiver, a transmitter, and processing circuitry coupled to the receiver and the transmitter. The processing circuitry is configured to determine to page one or more user equipments (UEs). The processing circuitry is configured to transmit, via the transmitter, a paging indicator associated with the one or more UEs. The processing circuitry is configured to receive, via the receiver, in response to the transmitted paging indicator, a predefined uplink signal from at least one of the one or more UEs. The processing circuitry is configured to send, via the transmitter, in response to the received predefined uplink signal, a downlink message for initiating an exchange and verification of one or more paging identities, wherein each of the one or more paging identities is uniquely associated with one of the one or more UEs.

Also disclosed is a method in a user equipment (UE). The method comprises receiving a paging indicator from a network node. The method comprises determining whether the received paging indicator matches an identifier associated with the UE. The method comprises upon determining that the received paging indicator matches the identifier associated with the UE, transmitting a predefined uplink signal to the network node. The method comprises receiving a downlink message for initiating an exchange and verification of one or more paging identities, wherein each of the one or more paging identities is uniquely associated with one of a plurality of UEs.

In certain embodiments, the downlink message for initiating the exchange and verification of one or more paging identities may comprise the one or more paging identities. The method may comprise comparing the received one or more paging identities with a paging identity associated with the UE. The method may comprise determining, based on the comparison of the received one or more paging identities with the paging identity associated with the UE, that the UE is being paged. The method may comprise sending, to the network node, an uplink message in response to the page.

In certain embodiments, the downlink message for initiating the exchange and verification of one or more paging identities may comprise an uplink grant enabling the UE to send a paging identity uniquely associated with the UE to the network node. The method may comprise sending, to the network node, the paging identity uniquely associated with the UE to enable the network node to compare the paging identity uniquely associated with the UE to a list of paging identities of one or more UEs to be paged.

In certain embodiments, the identifier associated with the UE may comprise a paging indicator allocated to the UE before receiving the paging indicator.

In certain embodiments, the identifier associated with the UE may be a subset of bits of the paging identity associated with the UE. In certain embodiments, the paging indicator may further comprise a field indicating one or more of: a length of the paging indicator; and a format of the paging indicator.

In certain embodiments, the predefined uplink signal may be a Physical Random Access Channel (PRACH) preamble.

In certain embodiments, the downlink message may further comprise downlink data intended for one or more of: the UE; and another UE of the plurality of UEs associated with the one or more paging identities in the downlink message. In certain embodiments, the method may comprise determining that at least a portion of the downlink data is intended for the UE, and processing the at least a portion of the downlink data.

In certain embodiments, the method may further comprise being configured with a minimum length of a received paging indicator that the UE should accept and use in comparing the received one or more paging identities with the paging identity associated with the UE.

Also disclosed is a user equipment (UE). The UE comprises a receiver, a transmitter, and processing circuitry coupled to the receiver and the transmitter. The processing circuitry is configured to receive, via the receiver, a paging indicator from a network node. The processing circuitry is configured to determine whether the received paging indicator matches an identifier associated with the UE. The processing circuitry is configured to, upon determining that the received paging indicator matches the identifier associated with the UE, transmit, via the transmitter, a predefined uplink signal to the network node. The processing circuitry is configured to receive, via the receiver, a downlink message for initiating an exchange and verification of one or more paging identities, wherein each of the one or more paging identities is uniquely associated with one of a plurality of UEs.

Certain embodiments of the present disclosure may provide one or more technical advantages. For example, certain embodiments may advantageously reduce control plane overhead and transmission resource usage in conjunction with paging, in particular when multiple UEs are being paged and the page is delivered using beam sweeping. As another example, certain embodiments may advantageously mitigate the drawbacks of existing approaches, such as the load on the UEs and UL transmission resources, as well as the increased energy consumption in the UE. Certain embodiments may advantageously save energy in the UE and also in the network. This may advantageously provide a more resource efficient approach. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 10 is a block schematic of an exemplary network node, in accordance with certain embodiments.

DETAILED DESCRIPTION

Figure 1:
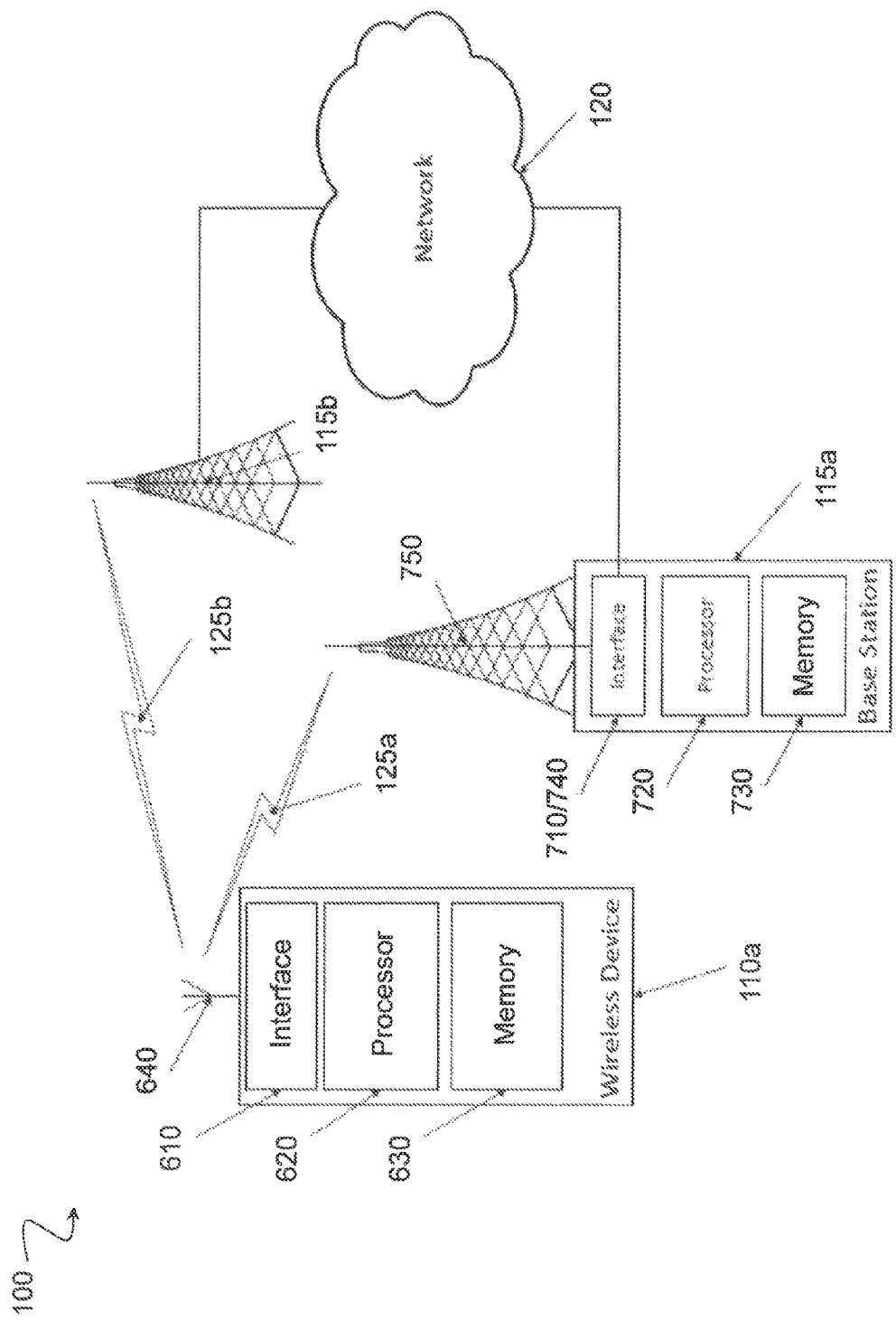
FIG. 1 is a block diagram illustrating an embodiment of a network, in accordance with certain embodiments.

As described above, it is wasteful to sweep paging messages in narrow beams, potentially in many cells. In case a single UE is being paged, these transmissions will typically be redundant in all but one (or even all) of the cells. Although certain response driven approaches may achieve savings in terms of DL signaling and reduce network energy consumption, there are certain deficiencies associated with these approaches. For example, the savings in terms of DL signaling and reduced network energy consumption are achieved at the expense of a higher load on the UEs and the UL. Rather than just receiving a DL message, a UE addressed by the paging indicator will have to perform random access and transmit its response message as message 3 (Msg3) to the network node just to check if it is indeed being paged. For each responding UE, this turns out to be two UL transmissions (preamble+Msg3) and two DL transmissions (Random Access Response (RAR)+page Acknowledgement (ACK)/Negative Acknowledgement (NACK), assuming the NACK option is used). Thus, the overall resource and energy consumption improvement may not be so great, depending on the number of beams in a sweep and the number of UEs allocated to the same paging indicator. Moreover, energy efficiency is typically more important in the UE than in the network, from the perspective that a certain amount of saved energy in the UE has a positive impact on the performance (to a larger degree than in the network) in addition to the environmental benefits.

To address the above-described issues and shortcomings, various embodiments are described herein in which each UE is allocated to one out of a number of possible paging indicators. In certain embodiments, when a UE receives its paging indicator, the UE transmits a predefined UL signal (e.g., a Physical Random Access Channel (PRACH) preamble) without proceeding to transmit Msg3 in connection with the random access procedure. In certain embodiments, the UE may proceed to transmit Msg3 in connection with the random access procedure. The predefined UL signal may be dedicated for this purpose and, in some cases, may be common for all UEs. When a network node (e.g., eNB or gNB) receives the predefined UL signal, the network node may respond responds with a DL message for initiating an exchange and verification of one or more paging identities. In certain embodiments, the DL message for initiating an exchange and verification of one or more paging identities may contain the list of paging identities of one or more UEs that are actually being paged. In certain embodiments, the DL message for initiating the exchange and verification of one or more paging identities may comprise an UL grant enabling a UE to provide its paging identity (which is uniquely associated with the UE) to the network node. In certain embodiments, when transmitting this response message, the network node may make use of directional reciprocity and transmit the power in the same directions as it received the preamble. This way, the network node ensures that (at least in Time Division Duplex (TDD) deployments) the transmission reaches the one or more UEs that transmitted the preamble (i.e., the mirrored transmission works for both multipath propagation and multi-sender cases). The embodiments described herein are relevant for at least paging/notification of UEs in both idle and inactive states.

According to one example embodiment, a method in a network node is disclosed. The network node determines to page one or more UEs, and transmits a paging indicator associated with the one or more UEs. In certain embodiments, the paging indicator may be allocated to the UE before determining to page the one or more UEs. In certain embodiments, the paging indicator may be a set of bits that is the same as a subset of bits of each of the one or more paging identities uniquely associated with one of the one or more UEs. In such a scenario, the paging indicator may further comprise a field indicating one or more of: a length of the paging indicator; and a format of the paging indicator.

The network node receives, in response to the transmitted paging indicator, a predefined UL signal from at least one of the one or more UEs. In certain embodiments, the predefined UL signal may be a PRACH preamble. The network node sends, in response to the received predefined UL signal, a DL message for initiating an exchange and verification of one or more paging identities, wherein each of the one or more paging identities is uniquely associated with one of the one or more UEs. In certain embodiments, the DL message for initiating the exchange and verification of one or more paging identities may comprise the one or more paging identities. In certain embodiments, the DL message for initiating the exchange and verification of one or more paging identities may comprise an UL grant enabling a first UE of the one or more UEs to provide a first paging identity uniquely associated with the first UE. In certain embodiments, the DL message may further comprise DL data or an UL grant intended for a first UE of the one or more UEs. The method may further comprise determining whether to transmit DL data for the first UE in the DL message based on a traffic load in a cell where the DL message will be transmitted.

According to another example embodiment, a method in a UE is disclosed. The UE receives a paging indicator from a network node. The UE determines whether the received paging indicator matches an identifier associated with the UE. In certain embodiments, the identifier associated with the UE may comprise a paging indicator allocated to the UE before receiving the paging indicator. In certain embodiments, the identifier associated with the UE may be a subset of bits of the paging identity associated with the UE.

Upon determining that the received paging indicator matches the identifier associated with the UE, the UE transmits a predefined UL signal to the network node. In certain embodiments, the predefined UL signal may be a PRACH preamble. The UE receives a DL message for initiating an exchange and verification of one or more paging identities, each of the one or more paging identities may be uniquely associated with one of a plurality of UEs. In certain embodiments, the DL message for initiating the exchange and verification of one or more paging identities may comprise the one or more paging identities. In certain embodiments, the DL message for initiating the exchange and verification of one or more paging identities may comprise an UL grant enabling the UE to send a paging identity uniquely associated with the UE to the network node. In certain embodiments, the DL message may include DL data intended for one or more of: the UE; and another UE of the plurality of UEs associated with the one or more paging identities in the DL message. In certain embodiments, the UE compares the received one or more paging identities with a paging identity associated with the UE. In certain embodiments, the UE determines, based on the comparison of the received one or more paging identities with the paging identity associated with the UE, that the UE is being paged.

These and other example embodiments are described in more detail below in relations to FIGS. 2-10.

FIG. 1 is a block diagram illustrating an embodiment of a network 100, in accordance with certain embodiments. Network 100 includes one or more wireless devices 110 (also referred to herein as UEs), including wireless device 110*a*, and one or more network node(s) 115 (e.g., an eNB or gNB), including network nodes 115*a* and 115*b* in the example embodiment of FIG. 1. In the example of FIG. 1, wireless device 110*a* comprises processing circuitry 620, memory 630, interface 610 and antenna 640. Network node 115*a* comprises processing circuitry 720, memory 730, interface 710/740, and antenna 750. These components may work together in order to provide network node and/or wireless device functionality, such as providing wireless connections in network 100.

For example, wireless devices 110 may communicate with network nodes 115 over a wireless interface. For example, wireless device 110 may transmit wireless signals 125*a*, 125*b* to one or more of network nodes 115, and/or receive wireless signals 125*a*, 125*b* from one or more of network nodes 115. Wireless signals 125*a*, 125*b* may contain voice traffic, data traffic, control signals, and/or any other suitable information. In some embodiments, an area of wireless signal coverage associated with a network node 115 may be referred to as a cell. In certain embodiments, network nodes 115 may support directional reciprocity, digital transmission beamforming, and TDD. In some embodiments, wireless device 110 may have device-to-device (D2D) capability. Thus, wireless device 110*a* may be able to receive signals from and/or transmit signals directly to another wireless device 110.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of one or more Internet Protocol (IP) networks, public switched telephone networks (PSTNs), packet data networks, optical networks, public or private data networks, local area networks (LANs), wireless local area networks (WLANs), wired networks, wireless networks, metropolitan area networks (MANs), wide area networks (WAN), a local, regional, or global communication or computer network such as the Internet, an enterprise intranet, or any other suitable communication links, including combinations thereof; to enable communication between devices.

In some embodiments, the core network node may manage the establishment of communication sessions and various other functionalities for wireless devices 110. Wireless devices 110 may exchange certain signals with the core network node using the non-access stratum (NAS) layer. In NAS signaling, signals between wireless devices 110 and the core network node may be transparently passed through the RAN. In certain embodiments, network nodes 115 may interface with one or more network nodes over an internode interface, such as, for example, an X2 interface.

As described above, example embodiments of network 100 may include one or more wireless devices 110, and one or more different types of network nodes 115 capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices may be configured to transmit and/or receive information without direct human interaction. For instance, a wireless device may be designed to transmit information to a network on a predetermined schedule, when triggered by an internal or external event, or in response to requests from the network. Generally, a wireless device may represent any device capable of, configured for, arranged for, and/or operable for wireless communication, for example radio communication devices. Examples of wireless devices include, but are not limited to, UEs such as smart phones. Further examples include wireless cameras, wireless-enabled tablet computers, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless device 110 may support D2D communication, for example by implementing a 3GPP standard for sidelink communication, and may in this case be referred to as a D2D communication device.

As yet another specific example, in an Internet of Things (IOT) scenario, a wireless device may represent a machine or other device that performs monitoring and/or measurements, and transmits the results of such monitoring and/or measurements to another wireless device and/or a network node. The wireless device may in this case be a M2M device, which may in a 3GPP context be referred to as a MTC device. As one particular example, the wireless device may be a UE implementing the 3GPP narrow band interact of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 1, wireless device 110 may be any type of wireless endpoint, mobile station, mobile phone, wireless local loop phone, smartphone, UE, desktop computer, PDA, cell phone, tablet, laptop, VoIP phone or handset, which is able to wirelessly send and receive data and/or signals to and from a network node, such as network node 115 and/or other wireless devices. Wireless device 110 comprises processing circuitry 620, memory 630, interface 610, and antenna 640. The components of wireless device 110 are depicted as single boxes located within a single larger box, however in practice a wireless device may comprise multiple different physical components that make up a single illustrated component (e.g., memory 630 may comprise multiple discrete microchips, each microchip representing a portion of the total storage capacity).

Processing circuitry 620 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as memory 630, wireless device 110 functionality. Such functionality may include providing various wireless features discussed herein, including any of the features or benefits disclosed herein.

Memory 630 may be any form of volatile or non-volatile memory including, without limitation, persistent storage, solid state memory, remotely mounted memory, magnetic media, optical media, random access memory (RAM), read-only memory (ROM), removable media, or any ether suitable local or remote memory component. Memory 630 may store any suitable data, instructions, or information, including software and encoded logic, utilized by wireless device 110. Memory 630 may be used to store any calculations made by processing circuitry 620 and/or any data received via interface 610.

Interface 610 may be used in the wireless communication of signalling and/or data between wireless device 110 and network nodes 115. For example, interface 610 may perform any formatting, coding, or translating that may be needed to allow wireless device 110 to send and receive data from network nodes 115 over a wireless connection. Interface 610 may also include a radio transmitter and/or receiver that may be coupled to or a part of antenna 640. The radio may receive digital data that is to be sent out to network nodes 115 via a wireless connection. The radio may convert the digital data into a radio signal having the appropriate channel and bandwidth parameters. The radio signal may then be transmitted via antenna 640 to network nodes 115.

Antenna 640 may be any type of antenna capable of transmitting and receiving data and/or signals wirelessly. In some embodiments, antenna 640 may comprise one or more omni-directional, sector or panel antennas operable to transmit/receive radio signals between, for example, 2 GHz and 66 GHz. In some embodiments, antenna 640 may be able to transmit/receive signals outside this range. As one example, an antenna 640 operating in a 5G system may support transmission/reception at lower frequencies (e.g., as low as 400 MHz). For simplicity, antenna 640 may be considered a part of interface 610 to the extent that a wireless signal is being used.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio access points. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may, also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs, etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

In FIG. 1, network node 115a comprises processing circuitry 720, memory 730, interface 710/740, and antenna 750. These components are depicted as single boxes located within a single larger box. In practice, however, network node 115a may comprise multiple different physical components that make up a single illustrated component (e.g., interface 710/740 may comprise terminals for coupling wires for a wired connection and a radio transceiver for a wireless connection). As another example, network node 115a may be a virtual network node in which multiple different physically separate components interact to provide the functionality of network node 115a (e.g., processing circuitry 720 may comprise three separate processors located in three separate enclosures, where each processor is responsible for a different function for a particular instance of network node 115a). Similarly, network node 115a may be composed of multiple physically separate components (e.g., a NodeB component and a RNC component, a BTS component and a BSC component, etc.), which may each have their own respective processor, storage, and interface components. In certain scenarios in which network node 115a comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115a may be configured to support multiple radio access technologies (RATs). In such embodiments, some components may be duplicated (e.g., separate memory 730 for the different RATs) and some components may be reused (e.g., the same antenna 750 may be shared by the RATs).

Processing circuitry 720 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115a components, such as memory 730, network node 115a functionality. For example, processing circuitry 720 may execute instructions stored in memory 730. Such functionality may include providing various wireless features discussed herein to one or more wireless devices, such as wireless device 110, including any of the features or benefits disclosed herein.

Memory 730 may comprise any form of volatile or non-volatile computer readable memory including, without limitation, persistent storage, solid state memory, remotely mounted memory, magnetic media, optical media, RAM, ROM, removable media, or any other suitable local or remote memory component. Memory 730 may store any suitable instructions, data or information, including software and encoded logic, utilized by network node 115a. Memory 730 may be used to store any calculations made by processor 720 and/or any data received via interface 710/740.

Network node 115a also comprises interface 710/740 which may be used in the wired or wireless communication of signalling and/or data between network node 115a, network node 115b, and/or wireless device 110. For example, interface 710/740 may perform any formatting, coding, or translating that may be needed to allow network node 115a to send and receive data from network 115b over a wired connection. Interface 710/740 may also include a radio transmitter and/or receiver that may be coupled to or a part of antenna 750. The radio may receive digital data that is to be sent out to other network nodes or wireless devices via a wireless connection. The radio may convert the digital data into a radio signal having the appropriate channel and bandwidth parameters. The radio signal may then be transmitted via antenna 750 to the appropriate recipient (e.g., wireless device 110).

Antenna 750 may be any type of antenna capable of transmitting and receiving data and/or signals wirelessly. In some embodiments, antenna 750 may comprise one or more omni-directional, sector or panel antennas operable to transmit/receive radio signals between, for example, 2 GHz and 66 GHz. In some embodiments, antenna 750 may be able to transmit/receive signals outside this range. As one example, an antenna 750 operating in a 5G system may support transmission/reception at lower frequencies (e.g., as low as 400 MHz). An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, the term "radio node" is used generically to refer both to wireless devices and network nodes, as each is respectively described above.

The terminology such as network node and wireless device should be considered non-limiting and does in particular not imply a certain hierarchical relation between the two; in general "network node" could be considered as device 1 and "wireless device" device 2, and these two devices communicate with each other over some radio channel.

Example embodiments of wireless device 110, network nodes 115, and other network nodes (such as radio network controller or core network node) are described in more detail below with respect to FIGS. 5-10.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). In different embodiments, the wireless network 100 may comprise any number of wired or wireless networks, network nodes, base stations, controllers, wireless devices, relay stations, and/or any other components that may facilitate or participate in the communication of data and/or signals whether via wired or wireless connections.

Furthermore, although certain embodiments may be described as implemented in a LTE network, the embodiments may be implemented in any appropriate type of telecommunication system using any suitable components, and are applicable to any RAT or multi-RAT systems where network assistance information can be provided to an application client in order to optimize QoE at the end user. For example, the various embodiments described herein may be applicable to LTE, LTE-Advanced, NR, 5G, UMTS, HSPA, GSM, cdma2000, WCDMA, WiMax, UMB, WiFi, another suitable RAT, or any suitable combination of one or more RATs. Thus, network 100 may represent any type of communication, telecommunication, data, cellular, and/or radio network or other type of system. In particular embodiments, the network 100 may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

Although certain embodiments may be described in the context of wireless transmissions in the DL, the present disclosure contemplates that the various embodiments are equally applicable in the UL.

Although the solutions described herein may be implemented in any appropriate type of system using any suitable components, particular embodiments of the described solutions may be implemented in a wireless network such as the example wireless communication network illustrated in FIG. 1. In the example embodiment of FIG. 1, the wireless communication network provides communication and other types of services to one or more wireless devices. In the illustrated embodiment, the wireless communication network includes one or more instances of network nodes that facilitate the wireless devices' access to and/or use of the services provided by the wireless communication network. The wireless communication network may further include any additional elements suitable to support communication between wireless devices or between a wireless device and another communication device, such as a landline telephone.

Some of the embodiments contemplated herein will now be described more fully hereinafter with reference to the accompanying drawings. Other embodiments, however, are contained within the scope of this disclosure and should not be construed as limited to only the embodiments set forth herein; rather, these embodiments are provided by way of example to convey the scope of the concept to those skilled in the art. Like numbers refer to like elements throughout the description.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

As described above, there are certain deficiencies associated with existing approaches to paging wireless devices 110. For example, it is wasteful to sweep paging messages in narrow beams, potentially in many cells, at least in part because if only a single wireless device 110 is being paged, these transmissions are redundant in all but one (or even all) of the cells. Additionally, certain response-driven approaches result in a higher load on wireless devices 110 and the UL. The present disclosure contemplates various embodiments that may advantageously address these and other deficiencies associated with existing approaches. The various embodiments described herein include both network and wireless device aspects. As described in more detail below, in certain embodiments a network node 115 (e.g., network node 115a) allocates (explicitly or implicitly) a paging indicator, which may be shorter than a full paging identity, to multiple wireless devices 110 (e.g., wireless device 110a) and subsequently pages at least one of the multiple wireless devices 110 using the paging indicator. In certain embodiments, a wireless device 110 that receives the paging indicator and has a matching paging indicator allocated, transmits an UL signal to network node 115a, and the network responds to this UL signal by transmitting a response. In certain embodiments, the response may contain the full paging identity of the wireless devices 110 being paged, in transmission directions derived at least in part from the direction(s) from which the UL signal transmission was received at network node 115a. In certain embodiments, the response may include an UL grant enabling a wireless device 110 to send a paging identity uniquely associated with the wireless device to network node 115a.

In certain embodiments, a network node 115 (e.g., network node 115a in the example of FIG. 1) may determine to page one or more wireless devices 110, such as wireless device 110a and potentially one or more other wireless devices 110 in network 100. In certain embodiments, network node 115a may determine to page wireless device 110a in response to receiving a request to page wireless device 110a (e.g., in response to a request from a core network node). Network node 115a transmits a paging indicator associated with wireless device 110a (and potentially other wireless devices 110 in network 100). In certain embodiments, network node 115 may transmit the paging indicator in multiple transmissions, and each of the multiple transmissions may be transmitted in a different direction. The multiple transmissions may be beamformed.

Wireless device 110a receives the paging indicator from network node 115A, and determines whether the received paging indicator matches an identifier associated with wireless device 110a. In certain embodiments, the identifier associated with wireless device 110a may be a paging indicator allocated to wireless device 110a before it received the paging indicator. As another example, in certain embodiments the identifier associated with wireless device 110a may be a subset of bits of the paging identity associated with wireless device 110a.

In certain embodiments, wireless device 110a may receive the paging indicator from multiple network nodes 115 (e.g., network node 115b in addition to network node 115a) using single frequency network (SFN) transmission.

The paging indicator may take a variety of forms. As one example, in certain embodiments, network node 115a may allocate a paging indicator to wireless device 110a prior to determining to page wireless device 110a. The paging indicator allocated to wireless device 110a by network node 115a may be one out of a number of possible paging indicators. In some cases, network node 115a may assign the same paging indicator or a different paging indicator to one or more other wireless devices 110 in network 100.

As another example, in certain embodiments a variable length paging indicator may be used. In certain embodiments, the variable length paging indicator may be realized as a configurable truncation of the paging identity of a wireless device 110 (e.g., wireless device 110a). In other words, the paging indicator could be seen as a short paging identity (and may be referred to herein using this term as well) used by multiple wireless devices 110. As such, it may be realized as a truncated version of a full wireless device (e.g., UE) paging identity. The number of bits in a short paging identity/paging indicator may be variable and indicated, for example, by preceding format and/or length indicator bits. Hence, in the general case, wireless device 110a could expect to receive a paging indicator of different lengths and, unless configured differently, wireless device 110a should regard a paging indicator as a match if the full number of bits of the paging indicator (excluding possible format bits) are equal to the corresponding number of initial (i.e., most significant) bits of the full paging identity of wireless device 110a, irrespective of the length of the paging indicator.

With this approach, wireless device 110a does not have to be explicitly allocated a paging indicator, since it can always compare a received paging indicator with its paging identity truncated to equal length. As an illustrative example, consider a scenario with a 40 bits long full paging identity (i.e., the length of the S-TMSI in LTE) and a format/length indicator of 2 bits. Then the 4 different possible paging indicator lengths the format/length indicator could indicate could be as shown in Table 1 below:

TABLE 1

| Format/Length Indicator | Characteristics |
| --- | --- |
| 00 | 2 bits (one out of 4 wireless devices is affected by the page) |
| 01 | 3 bits (one out of 8 wireless devices is affected by the page) |
| 10 | 5 bits (one out of 32 wireless devices is affected by the page indicator) |
| 11 | 40 bits (only one wireless device is affected and this wireless device knows it is addressed without first requesting a paging identity list from the network) |

In one particular example embodiment, the strategy in network 100 may be to limit the amount of data in the paging indicator message to a number of bits that can be transmitted so that a cell is fully covered (i.e., the transmission(s) reach the cell edge with acceptable signal-to-noise ratio (SNR)) using a small number of relatively wide beams or even a single wide or omnidirectional beam. The basis for this strategy is that the fewer information bits that are transmitted, the more robust modulation coding scheme (MCS) (i.e., more redundancy) can be applied, which allows successful reception with poorer SNR. In this particular example embodiment, a fixed size paging indicator message may be used. In cases where repetition of the paging indicator message is used to improve coverage, using a fixed message size may advantageously facilitate combination of multiple receptions of the paging indicator message.

With this strategy, network node 115a determines a maximum number of bits available for paging indicator(s) in a paging indicator message. If a fixed-size message is used, this maximum number of bits is given by the message size and format. Otherwise, this maximum number of bits may be deployment dependent and would typically be configured in network node 115a to match the transmit power available in a cell, the intended coverage area, and/or the desired beam configuration (and/or number of message transmission repetitions). The size of the paging indicator(s) to be included in the paging indicator message would then depend on the number of wireless devices 110 to be paged with the message and the paging indicator length required to address more than one of those wireless devices 110 with the same paging indicator. All this taken into account, when there is a maximum number of bits available to use for paging indicator(s), network node 115a may choose the length of the paging indicator(s) to match the number of wireless devices 110 to be paged and the maximum number of available bits.

As an illustrative example of such an embodiment, consider a scenario with a 40-bit full paging identity and a fixed-size paging indicator message containing 40 paging indicator bits divided into a number of equally sized paging indicator(s) (and padding if needed), wherein the length of each paging indicator is indicated by a two-bit length/format indicator applicable to all paging indicator(s) in the message. In such a scenario, the 4 different possible paging indicator lengths the format/length indicator could indicate could be as shown in Table 2 below

TABLE 2

| Format/Length Indicator | Characteristics |
| --- | --- |
| 00 | 5 bits (five to eight paging indicators can be included in the paging indicator message and thus at least five to eight wireless devices are paged and one out of 32 ($2^5$) wireless devices are affected by each paging indicator) |
| 01 | 10 bits (three of four paging indicators can be included in the paging indicator message and thus at least three or four wireless devices are paged and one out of 1024 ($2^{10}$) wireless devices are affected by each page indicator) |
| 10 | 20 bits (two paging indicators can be included in the paging indicator message and thus at least two wireless devices are paged and one out of 1048567 ($2^{20}$) wireless devices are affected by each page indicator) |
| 11 | 40 bits (only one wireless device is affected and this wireless device knows it is addressed without first requesting a paging identity list from the network) |

In certain embodiments, paging indicator length constraint rules may be used. For some wireless devices 110, the above-described behavior may not always be desirable because it will typically result in a wireless device sometimes transmitting the dedicated preamble and receiving the list of full paging identities from the network in vain (i.e., in the oases where the paging identity of the wireless device is not included in the list). In such a Scenario, network node 115a may determine whether to transmit the paging indicator to one or more wireless devices 110 based on certain criteria (e.g., one or more of a capability of the one or more wireless devices, a category of the one or more wireless devices, and information related to subscription data associated with the one or more wireless devices). Examples of types of wireless devices that possibly should be exempted from the above-described scheme could, for instance, be energy deprived wireless devices, such as certain MTC devices (e.g., battery powered or energy harvesting UEs (i.e., wireless devices that get energy from vibrations, temperature differences, sunlight, or another suitable source). In certain embodiments, to eliminate or reduce the fraction of "false pages" for such a wireless device (i.e., cases where the paging indicator matches the subset of bits of the paging identity of the wireless device, but the wireless device is not among the paged wireless devices), wireless devices 110 may be configured with a minimum paging indicator length that it should accept. That is, if a shorter paging indicator is received, the wireless device should ignore it, even if it matches the corresponding number of initial bits of the full paging identity of the wireless device. In certain embodiments, an alternative could be to explicitly configure the wireless device with a paging indicator (as described above) and instruct the wireless device to respond only to the allocated paging indicator (in addition to its full paging identity).

For a wireless device in idle mode, these types of paging indicator constraint rules may advantageously be NAS level configuration and provided to the wireless device using NAS signaling (e.g., in conjunction with the Attach procedure, for example in the Attach Accept message in EPS/LTE or a corresponding message in NGC/NR). The core network could indicate this information in a Paging message transferred to the RAN across the S1 interface (the interface between the RAN and the EPC in EPS/LTE). In other words, the minimum paging indicator length configured for a wireless device to be paged would be associated with the paging identity of the wireless device in the Paging message from the core network to the RAN. The same type of NAS level configuration could be used also for a wireless device in inactive mode. However, for a wireless device in inactive mode, for which the RAN stores a context, the paging indicator constraint rules may advantageously be conveyed to the RAN in the Initial Context Setup Request in EPS/LTE (or a corresponding message in NGC/NR). This way, the configured rule is available to the RAN all the time while the wireless device is registered in the RAN and can thus be used for RAN initiated paging. For a wireless device in inactive mode, RAN level configuration of paging indicator length constraint rules is an alternative to NAS level configuration. In some cases, RRC signaling could be used for this purpose, for example when the wireless device is switched from connected to inactive mode (e.g., RRC_CONNECTED to RRC_INACTIVE), when the RRC connection is established (e.g., in a RRCConnectionSetup message), or any time while the wireless device is in connected mode (e.g., using a RRCConnectionReconfiguration message).

Upon determining that the received paging indicator matches the identifier associated with wireless device 110a, wireless device 110a transmits a predefined UL signal to network node 115a. In certain embodiments, the predefined UL signal may be a PRACH preamble. In certain embodiments, the preamble may be dedicated for this purpose and common for all wireless devices 110. According to alternative embodiments, the preamble may be indicated in the paging indicator message sent by network node 115a to wireless device 110a.

In certain embodiments, wireless device 110a may, upon determining that the received paging indicator matches the identifier associated with wireless device 110a, wireless device 110a may transmit the predefined UL signal to another network node (e.g., network node 115b instead of network node 115a as described above).

Network node 115a (or, in certain embodiments, another network node 115, such as network node 115b) receives, in response to the transmitted paging indicator, the predefined UL signal from wireless device 110a. Network node 115a sends, in response to the received predefined UL signal, a DL message for initialing an exchange and verification of one or more paging identities. Each of the one or more paging identities may be uniquely associated with one of the one or more wireless devices 110 (e.g., wireless device 110a).

In certain embodiments, the DL message for initiating the exchange and verification of one or more paging identities may comprise the one or more paging identities. In other words, when network node 115a receives the preamble, network node 115a (instead of sending a RAR) responds with a message containing the list of paging identities of wireless devices 110 that are actually being paged (which may include wireless device 110a).

In certain embodiments, the DL message for initiating the exchange and verification of one or more paging identities may comprise an UL grant enabling wireless device 110a to provide a paging identity uniquely associated with wireless device 110a to network node 115a.

In certain embodiments, network node 115a, when transmitting the DL message, may make use of directional reciprocity and transmit the power in the same directions as it received the preamble. This way, network node 115a may advantageously ensure that (at least in TDD deployments) the transmission reaches the wireless devices 110 (such as wireless device 110a) that transmitted the preamble. In other words, the mirrored transmission works for both multipath propagation and multi-sender cases. In such a scenario, network node 115a may support directional reciprocity and use digital transmission beamforming and preferably TDD.

Network node 115a may perform the transmission of the DL message in a variety of ways. As one example, when transmitting its response to the predefined UL signal (i.e., the response message containing the paging identities of wireless devices 110 that are being paged), network node 115a may divide the transmission power between the different transmission directions in the same proportions as it received power from the predefined UL signal transmissions. Such an approach can be seen as a compromise attempt to utilize the channel optimally. As another example, in certain embodiments network node 115a may divide the transmission power in reverse proportions. Such an approach can be seen as a way of compensating for different channel qualities, which may be experienced by different wireless devices 110. This approach may be advantageously used when multiple wireless devices 110 are being paged. As another example, in certain embodiments network node 115a may transmit all the power in the direction from which it received the strongest transmission of the predefined UL signal (i.e., the transmission of the predefined UL signal with the most power). Such an approach may be advantageously used when a single wireless device 110 is being paged, and can be seen as an attempt to leverage the transmission power as much as possible by using only the seemingly best transmission path.

In certain embodiments, opportunistic delivery of DL data or an UL grant may be used. For example, if wireless device 110a is in inactive mode, pending DL data or an UL grant (allocating UL transmission resources to wireless device 110a) could be opportunistically delivered to wireless device 110a in response to the predefined UL signal. Since this data/grant transmission may be redundant in a majority of the cases (the fraction of redundant transmissions depends on the length of the paging indicator in relation to the full paging identity of a wireless device), such an approach may be advantageously used when the load in the cell/transmission-reception point (TRP)/network node is low and transmission resources are abundant. For opportunistic data delivery, user plane protection (e.g., encryption) may need to be applied using security parameters, such as an encryption key, associated with the security context of wireless device 110a in the RAN. This is merely an illustrative example, as other user plane protection or security parameters may be used.

Wireless device 110a receives the DL message initiating the exchange and verification of one or more paging identities. According to one example embodiment, where the DL message initiating the exchange and verification of one or more paging identities includes an UL grant enabling wireless device 110a to provide its paging identity to network node 115a. In other words, the UL grant may allocate resources to wireless device 110a for sending its paging identity to network node 115a. In such a scenario, network node 115a may receive the paging identity from wireless device 110a, and compare the paging identity of wireless device 110a to a list of paging identities of one or more wireless devices to be paged. If the paging identity of wireless device 110a matches a paging identity on the list of paging identities network node 115a responds to wireless device 110a using dedicated transmission. In certain embodiments, if there is no match, network node 115a may respond with a negative indication.

According to another example embodiment, the DL message initiating the exchange and verification of one or more paging identities includes the one or more paging identities, wireless device 110a compares the received one or more paging identities with a paging identity associated with wireless device 110a. Based on the comparison of the received one or more paging identities with the paging identity associated with wireless device 110a, wireless device 110a may determine whether it is in fact being paged. For example, if there is a match between a paging identity included in the received DL message and the paging identity associated with wireless device 110a, wireless device 110a may determine that it is being paged. If wireless device 110a determines that it is being paged (i.e., there is a match between a paging identity included in the received DL message and the paging identity associated with wireless device 110a), wireless device 110a may send an UL message to network node 115a. In certain embodiments, wireless device 110a may send the UL message to a different network node 115 than the one from which it received the DL message (e.g., network node 115b in the example of FIG. 1).

If, however, there is not a match between the paging identity included in the received DL message and the paging identity associated with wireless device 110a, wireless device 110a may determine that it is not being paged. It as described above, DL data is opportunistically delivered to wireless device 110a in the DL message, wireless device 110a may determine that at least a portion of the DL data is intended for wireless device 110a, and process at least a portion of the DL data.

With this example embodiment, if there is at least one wireless device 110 addressed by the paging indicator (i.e., a wireless device 110 that has been allocated this paging indicator) in the cell, network node 115a only has to transmit one message. Thus, the above-described approaches may advantageously save energy in wireless devices 110 and, if compared with the existing approach in which the page NACK indication is used, the various approaches described above may also advantageously save energy in the network and may, overall, provide a more resource efficient mechanism than the existing approaches described above.

In some cases, it may be advantageous to selectively use the various embodiments described above. As one particular example, the above-described paging procedures may be applied selectively depending on the specific wireless device to be paged. In such a case, information about whether to apply the above-described embodiments may, for example, be included in a paging message from the core network or in a paging distribution message from another RAN node (e.g. another network node 115, such as network node 115b) or may be based on UE-specific information already available in network node 115a. An example of case where the UE-specific information is already available in network node 115a is when the anchor network node of a wireless device in inactive (RRC_INACTIVE) mode (i.e., the network node maintaining the UR context in the RAN) is paging the wireless device in its own cell(s). These are merely illustrative examples. It will be appreciated that other aspects may be used selectively, as appropriate.

Figure 2:
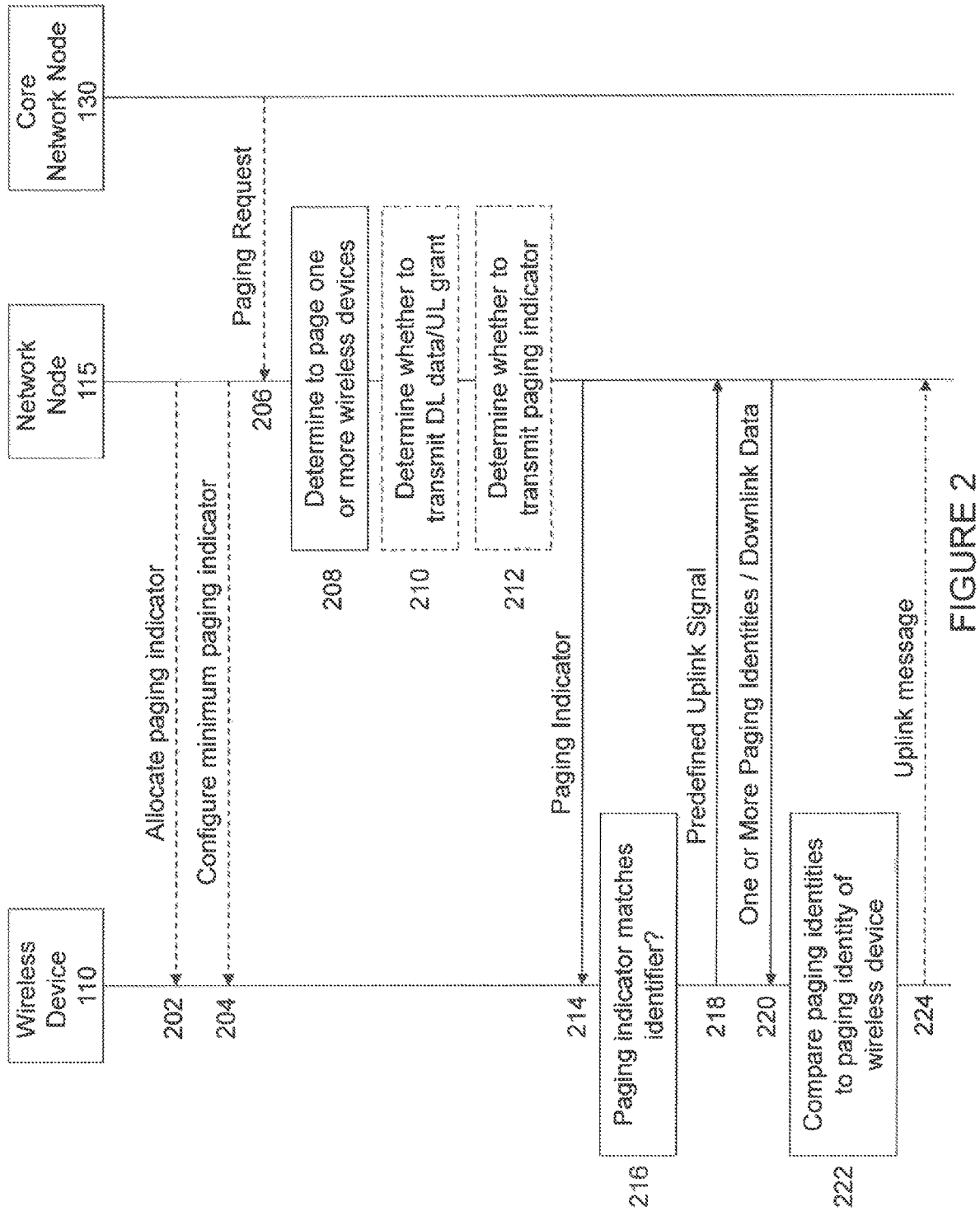
FIG. 2 is a signaling diagram, in accordance with certain embodiments.

FIG. 2 is a signaling diagram, in accordance with certain embodiments. More particularly, FIG. 2 illustrates a signaling diagram between wireless device 110 (e.g., a UE), network node 115, and core network node 130. In certain embodiments, at step 202 network node 115 allocates, from a number of possible paging indicators, a paging indicator to wireless device 110.

In certain embodiments, at step 204 network node 115 may configure wireless device 110 with a minimum paging indicator. As described above, configuring wireless device 110 with a minimum length of a received paging indicator that wireless device 110 should accept as an indication that wireless device 110 is one of the one or more wireless devices targeted by the paging indicator may help to minimize the occurrence of "false pages." Such an approach may be desirable, for example, in cases where wireless device 110 is energy deprived (e.g., an MTC device that is battery powered or energy harvesting).

In certain embodiments, at step 206, network node 115 receives a paging request from core network node 130. The paging request received from core network node 130 may be a request to page one or more wireless devices, including wireless device 110. At step 208, network node 115 determines to page one or more wireless devices. In certain embodiments, network node 115 may determine to page one or more wireless devices in response to receiving the paging request from core network node 130.

In certain embodiments, at step 210, network node 115 may determine whether to opportunistically transmit DL data or an UL grant to wireless device 110. The determination of whether to opportunistically transmit DL data or an UL grant to wireless device 110 may be based on any suitable criteria. For example, network node 115 may determine whether to opportunistically transmit DL data or an UL grant to wireless device 110 based on a traffic load in a cell associated with network node 115.

In certain embodiments, at step 212 network node 115 determines whether to transmit the paging indicator to wireless device 110. As described above, in some cases it may be advantageous to selectively use the various embodiments for paging using a paging indicator described herein. The determination of whether to transmit the paging indicator to wireless device 110 may be based on any suitable criteria. As one example, the determination of whether to transmit the paging indicator to wireless device 110 may be based on a capability of wireless device 110. As another example, the determination of whether to transmit the paging indicator to wireless device 110 may be based on a category of wireless device 110. As still another example, the determination of whether to transmit the paging indicator to wireless device 110 may be based on information related to subscription data associated with wireless device 110.

At step 214, network node 115 transmits the paging indicator to wireless device 110 and wireless device 110 receives the transmitted paging indicator. In some cases, network node 115 may transmit the paging indicator in response to determining at step 212 that the paging indicator should be used. In certain embodiments, network node 115 may transmit the paging indicator in multiple transmissions, and each of the multiple transmissions may be transmitted in a different direction. The multiple transmissions may be beamformed. As described above, in certain embodiments the transmitted paging indicator may be a paging indicator allocated to wireless device 110 (e.g., at step 202). Alternatively, the paging indicator may be a truncated version of a paging identity of wireless device 110. In such a scenario, the message transmitted by network node 115 at step 214 that includes the paging indicator may also include a field indicating a length and/or format of the paging indicator.

At step 216, wireless device 110 determines whether the received paging indicator matches an identifier associated with the UE. As described above, in certain embodiments the identifier associated with wireless device 110 may be a paging indicator allocated to wireless device 110 before receiving the paging indicator (e.g., as described above in relation to step 202). Alternatively, in certain embodiments the identifier associated with wireless device 110 may be a subset of bits of the paging identity associated with wireless device 110.

Upon determining that the received paging indicator matches the identifier associated with wireless device 110, at step 218 wireless device 110 transmits a predefined UL signal to network node 115, which receives the predefined UL signal from wireless device 110 in response to the transmitted paging indicator. In certain embodiments the predefined UL signal may be a PRACH preamble. At step 220, network node 115 sends, in response to the received predefined UL signal (e.g., PRACH preamble), a DL message comprising one or more paging identities, which is received by wireless device 110. Each of the paging identities may be uniquely associated with one or more wireless devices, such as wireless device 110. In certain embodiments, the DL message may also include DL data intended for wireless device 110 and/or another wireless device whose paging identity was included in the DL message transmitted by network node 115 at step 220.

At step 222, wireless device 110 compares the one or more paging identities received from network node 115 at step 220 with a paging identity associated with wireless device 110. Wireless device 110 may, based on the comparison of the one or more paging identities received from network node 115 and the paging identity associated with wireless device 110, determine whether or not wireless device 110 is being paged. For example, if the paging identity associated with wireless device 110 matches one or the one or more paging identities received from network node 115, wireless device 110 may determine that wireless device 110 is being paged. If, however, the paging identity associated with wireless device 110 does not match the one or more paging identities received from network node 115, wireless device 110 may determine that wireless device 110 is not being paged.

In certain embodiments, if wireless device 110 determines at step 222 that the paging identity associated with wireless device 110 matches one of the one or more paging identities received from network node 115, then at step 224 wireless device 110 sends an UL message to network nude 115. In certain embodiments, if wireless device 110 determines at step 222 that the paging identity associated with wireless device 110 does not match one of the one or more paging identities received from network node 115, then wireless device 110 may refrain from sending an UL message to network node 115.

Figure 3:
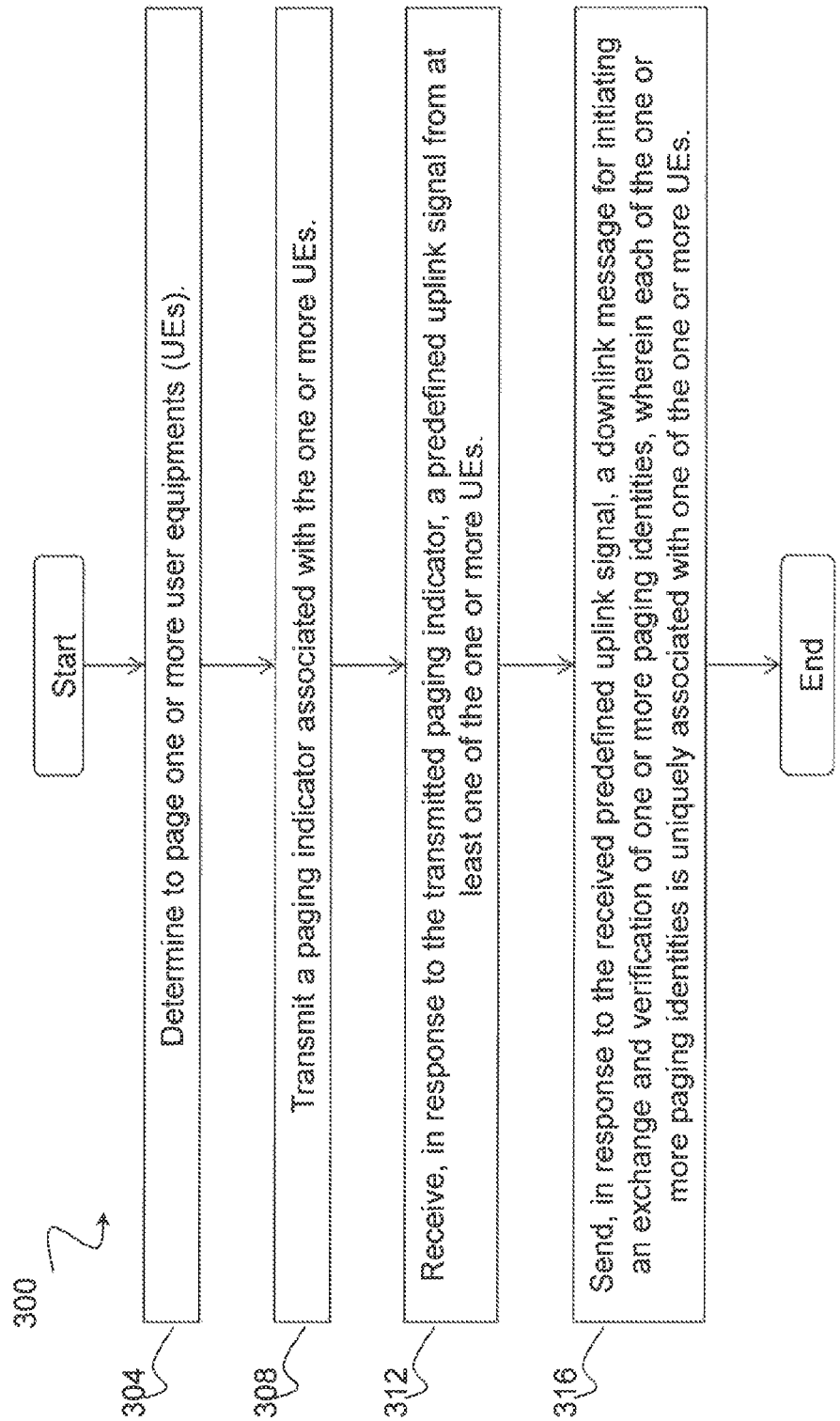
FIG. 3 is a flow diagram of a method in a network node, in accordance with certain embodiments.

FIG. 3 is a flow diagram of a method 300 in a network node, in accordance with certain embodiments. Method 300 begins at step 304, where the network node determines to page one or more UEs. In certain embodiments, the method may further comprise allocating the paging indicator to the one or more UEs prior to determining to page the one or more UEs. In certain embodiments, the method may comprise receiving, from another network node, a request to page the one or more UEs. In certain embodiments, the method may further comprise configuring at least one of the one or more UEs with a minimum length of a received paging indicator that the UE should accept as an indication that the UE is one of the one or more UEs targeted by the paging indicator.

At step 308, the network node transmits a paging indicator associated with the one or more UEs. In certain embodiments, transmitting the paging indicator may comprise transmitting multiple transmissions of the paging indicator. In certain embodiments, each of the multiple transmissions may be transmitted in a different direction. In certain embodiments, the multiple transmissions may be beamformed.

In certain embodiments, the paging indicator may comprise a set of bits that is the same as a subset of bits of each of the one or more paging identities uniquely associated with one of the one or more UEs. In certain embodiments, the paging indicator may further comprise a field indicating one or more of: a length of the paging indicator; and a format of the paging indicator.

In certain embodiments, the method may further comprise determining whether to transmit the paging indicator to the one or more UEs based on one or more of: a capability of the one or more UEs; a category of the one or more UEs; and information related to subscription data associated with the one or more UEs.

At step 312, the network node receives, in response to the transmitted paging indicator, a predefined uplink signal from at least one of the one or more UEs. In certain embodiments, the predefined UL signal may be a PRACH preamble.

At step 316, the network node sends, in response to the received predefined UL signal, a DL message for initiating an exchange and verification of one or more paging identities, wherein each of the one or more paging identities is uniquely associated with one of the one or more UEs. In certain embodiments, the downlink message for initiating the exchange and verification of one or more paging identities may comprise the one or more paging identities.

In certain embodiments, the DL message for initiating the exchange and verification of one or more paging identities may comprise an UL grant enabling a first UE of the one or more UEs to provide a first paging identity uniquely associated with the first UE (e.g., to the network node). The method may comprise receiving the first paging identity from the first UE, and comparing the received first paging identity to a list of paging identities of one or more UEs to be paged.

In certain embodiments, sending the DL message may comprise determining one or more directions from which the predefined UL signal was received from the at least one of the one or more UEs, and distributing transmitted power in the determined one or more directions.

In certain embodiments, the DL message may further comprise DL data intended for a first UE of the one or more UEs. The method may further comprise determining whether to transmit DL data for the first UE in the DL message based on a traffic load in a cell where the DL message will be transmitted.

Figure 4:
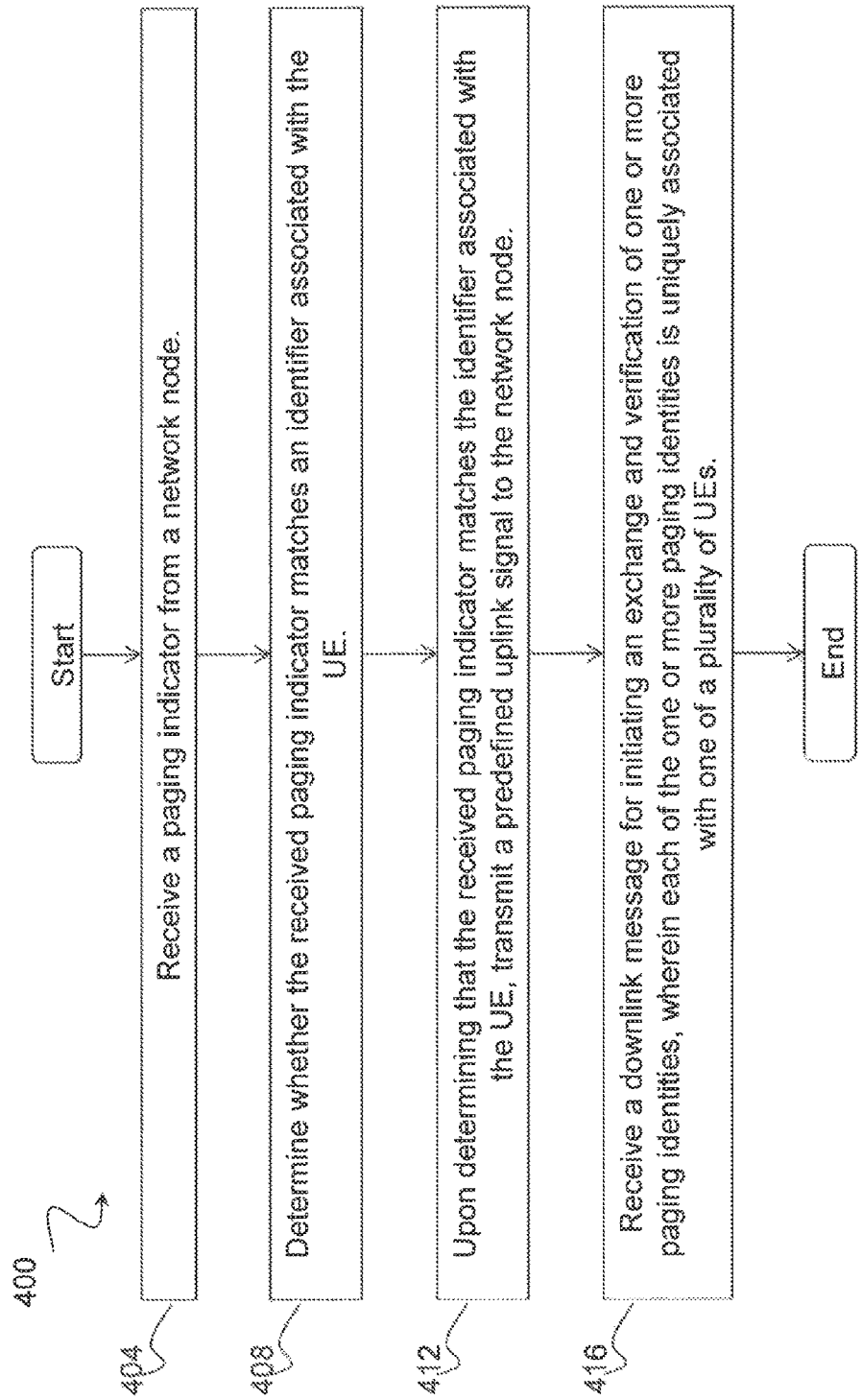
FIG. 4 is a flow diagram of a method in a UE, in accordance with certain embodiments.

FIG. 4 is a flow diagram of a method 400 in a UE, in accordance with certain embodiments. Method 400 begins at step 404, where the UE receives a paging indicator from a network node. In certain embodiments, the method may further comprise being configured with a minimum length of a received paging indicator that the UE should accept and use in comparing the received one or more paging identities with the paging identity associated with the UE.

At step 408, the UE determines whether the received paging indicator matches an identifier associated with the UE. In certain embodiments, the identifier associated with the UE may comprise a paging indicator allocated to the UE before receiving the paging indicator. In certain embodiments, the identifier associated with the UE may be a subset of bits of the paging identity associated with the UE. The paging indicator may further comprise a field indicating one or more of: a length of the paging indicator; and a format of the paging indicator.

At step 412, the UE, upon determining that the received paging indicator matches the identifier associated with the UE, transmits a predefined UL signal to the network node. In certain embodiments, the predefined UL signal may be a PRACH preamble.

At step 416, the UE receives a DL message for initiating the exchange and verification of one or more paging identities, wherein each of the one or more paging identities is uniquely associated with one of a plurality of UEs.

In certain embodiments, the DL message for initiating the exchange and verification of one or more paging identities may comprise the one or more paging identities. The method may comprise comparing the received on or more paging identities with a paging identity associated with the UE. The method may comprise determining, based on the comparison of the received one or more paging identities with the paging identity associated with the UE, that the UE is being paged. The method may comprise sending, to the network node, an UL message in response to the page.

In certain embodiments, the DL message for initiating the exchange and verification of one or more paging identities may comprise an uplink grant enabling the UE to send a paging identity uniquely associated with the UE to the network node. The method may comprise sending, to the network node, the paging identity uniquely associated with the UE to enable the network node to compare the paging identity uniquely associated with the UE to a list of paging identities of one or more UEs to be paged.

In certain embodiments, the DL message may further comprise DL data intended for one or more of: the UE; and another UE of the plurality of UEs associated with the one or more paging identities in the DL message. In certain embodiments, the method may comprise determining that at least a portion of the DL data is intended for the UE, and processing the at least a portion of the DL data.

Figure 5:
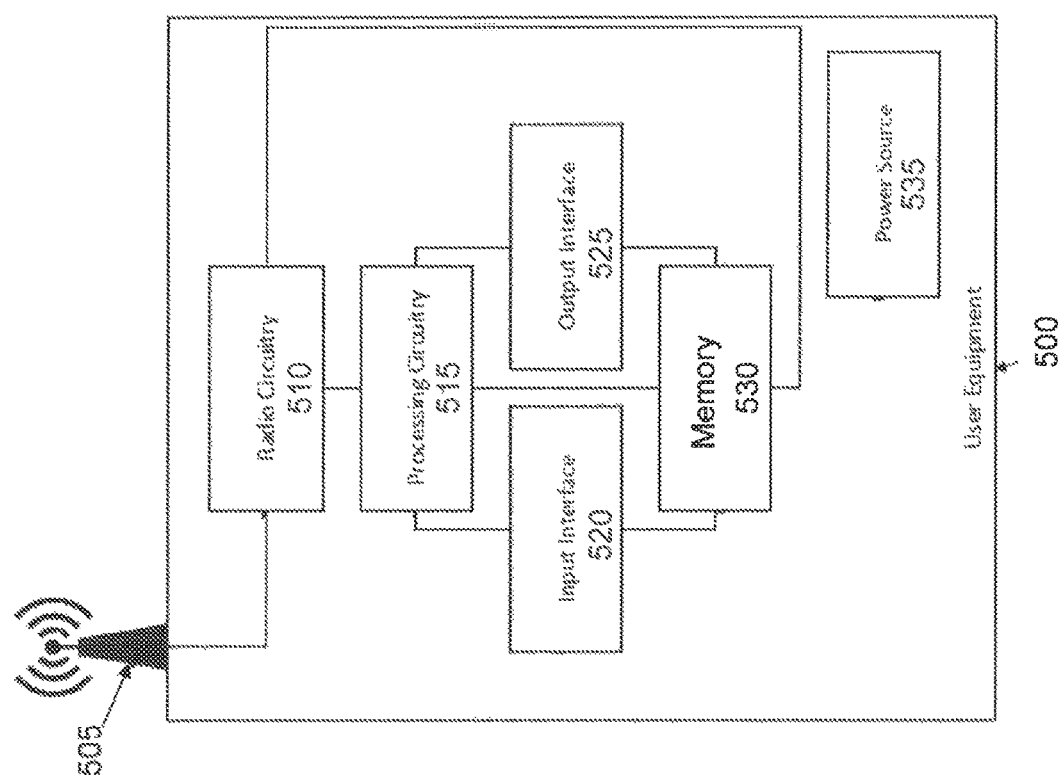
FIG. 5 is a block schematic of an exemplary UE, in accordance with certain embodiments.

FIG. 5 is a block schematic of an exemplary UE, in accordance with certain embodiments. As shown in FIG. 5, UE 500 is an example wireless device 110 described above. UE 500 includes an antenna 505, radio front-end circuitry 510, processing circuitry 515, and a computer-readable storage medium 530. Antenna 505 may include one or more antennas or antenna arrays, and is configured to send and/or receive wireless signals, and is connected to radio front-end circuitry 510. In certain alternative embodiments, wireless device 500 may not include antenna 505, and antenna 505 may instead be separate from wireless device 500 and be connectable to wireless device 500 through an interface or port.

The radio front-end circuitry 510 may comprise various filters and amplifiers, is connected to antenna 505 and processing circuitry 515, and is configured to condition signals communicated between antenna 505 and processing circuitry 515. In certain alternative embodiments, UE 500 may not include radio front-end circuitry 510, and processing circuitry 515 may instead be connected to antenna 505 without radio front-end circuitry 510.

Processing circuitry 515 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 515 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 515 executing instructions stored on a computer-readable storage medium 530. In alternative embodiments, some or all of the functionality may be provided by the processing circuitry 515 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 515 alone or to other components of UE 500, but are enjoyed by the UE as a whole, and/or by end users and the wireless network generally.

Antenna 505, radio front-end circuitry 510, and/or processing circuitry 515 may be configured to perform any receiving operations described herein as being performed by a UE or wireless device. Any information, data and/or signals may be received from a network node and/or another wireless device.

The processing circuitry 515 may be configured to perform any determining operations described herein as being performed by a wireless device. Determining as performed by processing circuitry 515 may include processing information obtained by the processing circuitry 515 by, for example, converting the obtained information into other information, comparing the obtained information or converted information to information stored in the wireless device, and/or performing one or more operations based on the obtained information or converted information, and as a result of said processing making a determination.

Antenna 505, radio front-end circuitry 510, and/or processing circuitry 515 may be configured to perform any transmitting operations described herein as being performed by a wireless device. Any information, data and/or signals may be transmitted to a network node and/or another wireless device.

Computer-readable storage medium 530 is generally operable to store instructions, such as a computer program, software, an application including one or more of logic, rules, code, tables, etc. and/or other instructions capable of being executed by a processor. Examples of computer-readable storage medium 530 include computer memory (for example, RAM or ROM), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 515. In some embodiments, processing circuitry 515 and computer-readable storage medium 530 may be considered to be integrated.

Alternative embodiments of UE 500 may include additional components beyond those shown in FIG. 5 that may be responsible for providing certain aspects of the UE's functionality, including any of the functionality described herein and/or any functionality necessary to support the solution described above. As just one example, UE 500 may include input interfaces, devices and circuits 520, and output interfaces, devices and circuits 525. Input interfaces, devices, and circuits 520 are configured to allow input of information into UE 500, and are connected to processing circuitry 515 to allow processing circuitry 515 to process the input information. For example, input interfaces, devices, and circuits 520 may include a microphone, a proximity or other sensor, keys/buttons, a touch display, one or more cameras, a USB port, or other input elements. Output interfaces, devices, and circuits 525 are configured to allow output of information from UE 500, and are connected to processing circuitry 515 to allow processing circuitry 515 to output information from UE 500. For example, output interfaces, devices, or circuits 525 may include a speaker, a display, vibrating circuitry, a USB port, a headphone interface, or other output elements. Using one or more input and output interfaces 520, 525, devices, and circuits, UE 500 may communicate with end users and/or the wireless network, and allow them to benefit from the functionality described herein.

As another example, UE 500 may include power source 535. Power source 535 may comprise power management circuitry. Power source 535 may receive power from a power supply, which may either be comprised in, or be external to, power source 535. For example, UE 500 may comprise a power supply in the form of a battery or battery pack which is connected to, or integrated in, power source 535. Other types of power sources, such as photovoltaic devices, may also be used. As a further example, UE 500 may be connectable to an external power supply (such as an electricity outlet) via an input circuitry or interface such as an electrical cable, whereby the external power supply supplies power to power source 535. Power source 535 may be connected to radio front-end circuitry 510, processing circuitry 515, and/or computer-readable storage medium 530 and be configured to supply UE 500, including processing circuitry 515, with power for performing the functionality described herein.

UE 500 may also include multiple sets of processing circuitry 515, computer-readable storage medium 530, radio circuitry 510, and/or antenna 505 for different wireless technologies integrated into wireless device 500, such as, for example, GSM, WCDMA, LTE, NR, WiFi, or Bluetooth wireless technologies. These wireless technologies may be integrated into the same or different chipsets and other components within wireless device 500.

Figure 6:
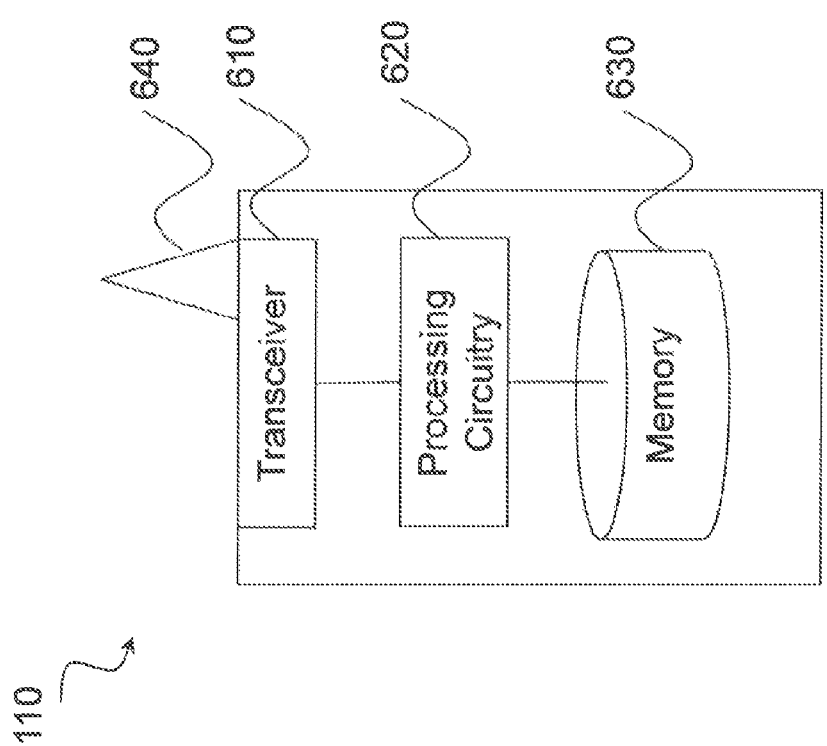
FIG. 6 is a block schematic of an exemplary wireless device, in accordance with certain embodiments.

FIG. 6 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, an actuator, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 610, processing circuitry 620, and memory 630. In some embodiments, transceiver 610 facilitates transmitting wireless signals to and receiving wireless signals from network node 115 (e.g., via antenna 640), processing circuitry 620 executes instructions to provide some or all of the functionality described above as being provided by wireless device 110, and memory 630 stores the instructions executed by processing circuitry 620.

Processing circuitry 620 may include any suitable combination of hardware and software implemented in one or more modules to execute instructions and manipulate data to perform sonic or all of the described functions of wireless device 110, such as the functions of wireless device 110 described above in relation to FIGS. 1-5. In some embodiments, processing circuitry 620 may include, for example, one or more computers, one or more CPUs, one or more microprocessors, one or more applications, one or more ASICs, one or more FPGAs and/or other logic.

Memory 630 is generally operable to store instructions, such as a computer program, software, an application including one or more of logic, rules, algorithms, code, tables, etc. and/or other instructions capable of being executed by processing circuitry 620. Examples of memory 630 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information, data, and/or instructions that may be used by processing circuitry 620.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
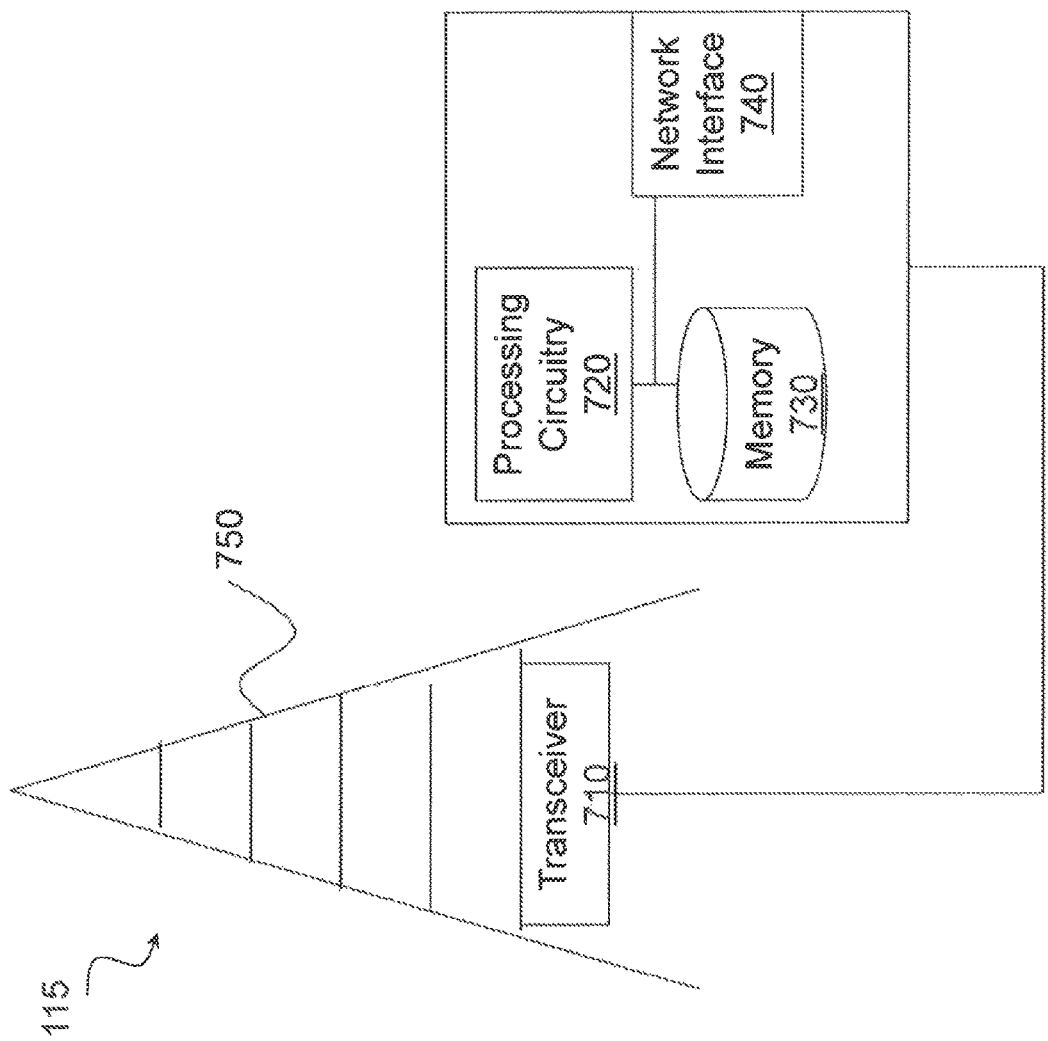
FIG. 7 is a block schematic of an exemplary network node, in accordance with certain embodiments.

FIG. 7 is a block schematic of an exemplary network node 115, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processing circuitry 720, memory 730, and network interface 740. In some embodiments, transceiver 710 facilitates transmitting wireless signals to and receiving wireless signals from wireless device 110 (e.g., via antenna 2050), processing circuitry 720 executes instructions to provide some or all of the functionality described above as being provided by a network node 115, memory 730 stores the instructions executed by processing circuitry 720, and network interface 740 communicates signals to backend network components, such as a gateway, switch, router, Internet, Public Switched Telephone Network (PSTN), core network nodes or radio network controllers 130, etc.

Processing circuitry 720 may include any suitable combination of hardware and software implemented in one or more modules to execute instructions and manipulate data to perform some or all of the described functions of network node 115, such as those described above in relation to FIGS. 1-5. In some embodiments, processing circuitry 720 may include, for example, one or more computers, one or more CPUs, one or more microprocessors, one or more applications, one or more ASICs, one or more FPGAs and/or other logic.

Memory 730 is generally operable to store instructions, such as a computer program, software, an application including one or more of logic, rules, algorithms, code, tables, etc. and/or other instructions capable of being executed by processing circuitry 720. Examples of memory 730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 740 is communicatively coupled to processing circuitry 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
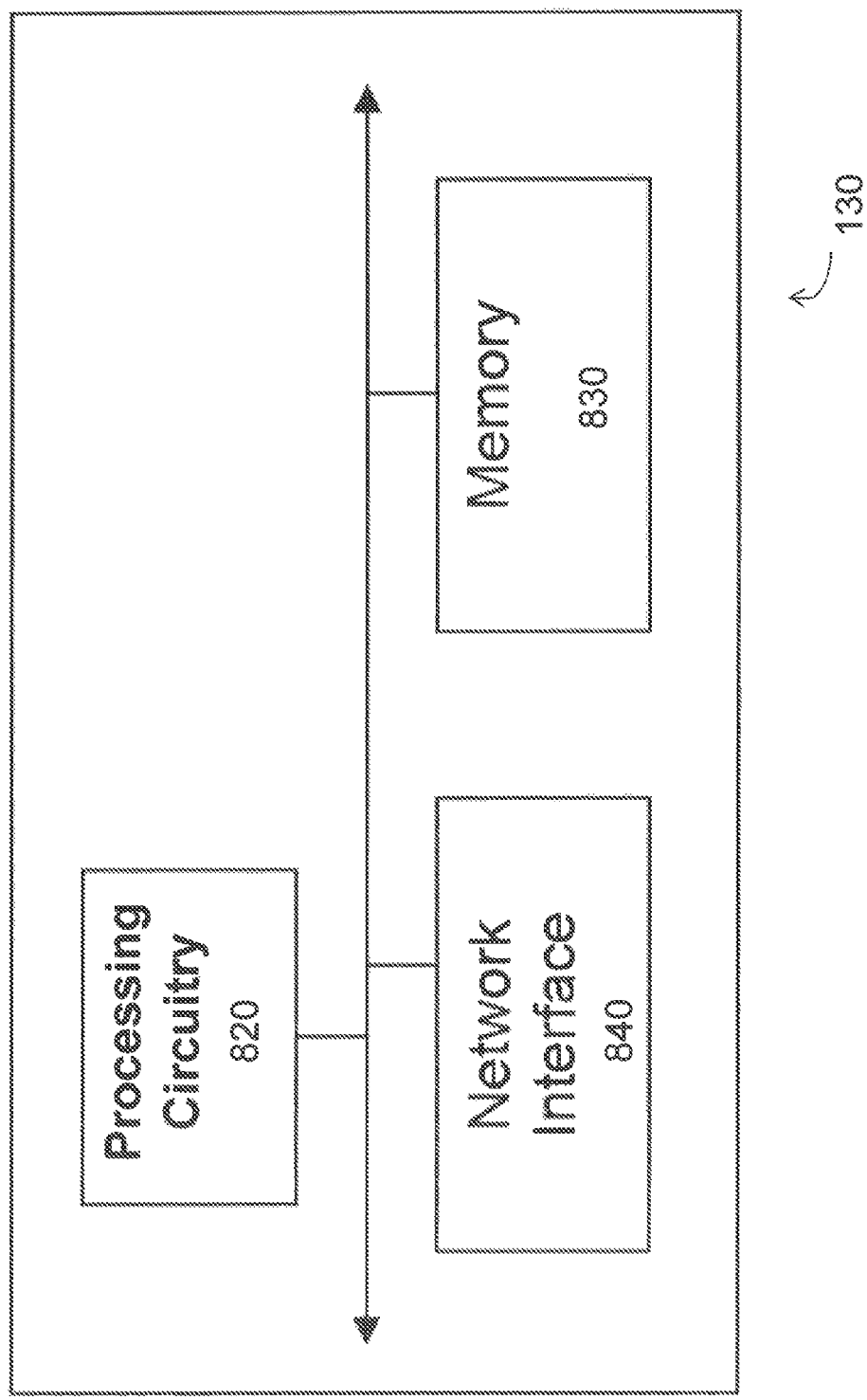
FIG. 8 is a block schematic of an exemplary radio network controller or core network node, in accordance with certain embodiments.

FIG. 8 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 820, memory 830, and network interface 840. In some embodiments, processing circuitry 820 executes instructions to provide some or all of the functionality described above as being provided by the network node, memory 830 stores the instructions executed by processing circuitry 820, and network interface 840 communicates signals to any suitable node, such as a gateway, switch, router, Internet, Public Switched Telephone Network (PSTN), network nodes 115, radio network controllers or core network nodes 130, etc.

Processing circuitry 820 may include any suitable combination of hardware and software implemented in one or more modules to execute instructions and manipulate data to perform some or all of the described functions of the radio network controller or core network node 130. In some embodiments, processing circuitry 820 may include, for example, one or more computers, one or more CPUs, one or more microprocessors, one or more applications, one or more ASICs, one or more FPGAs and/or other logic.

Memory 830 is generally operable to store instructions, such as a computer program, software, an application including one or more of logic, rules, algorithms, code, tables, etc. and/or other instructions capable of being executed by processing circuitry 820. Examples of memory 830 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
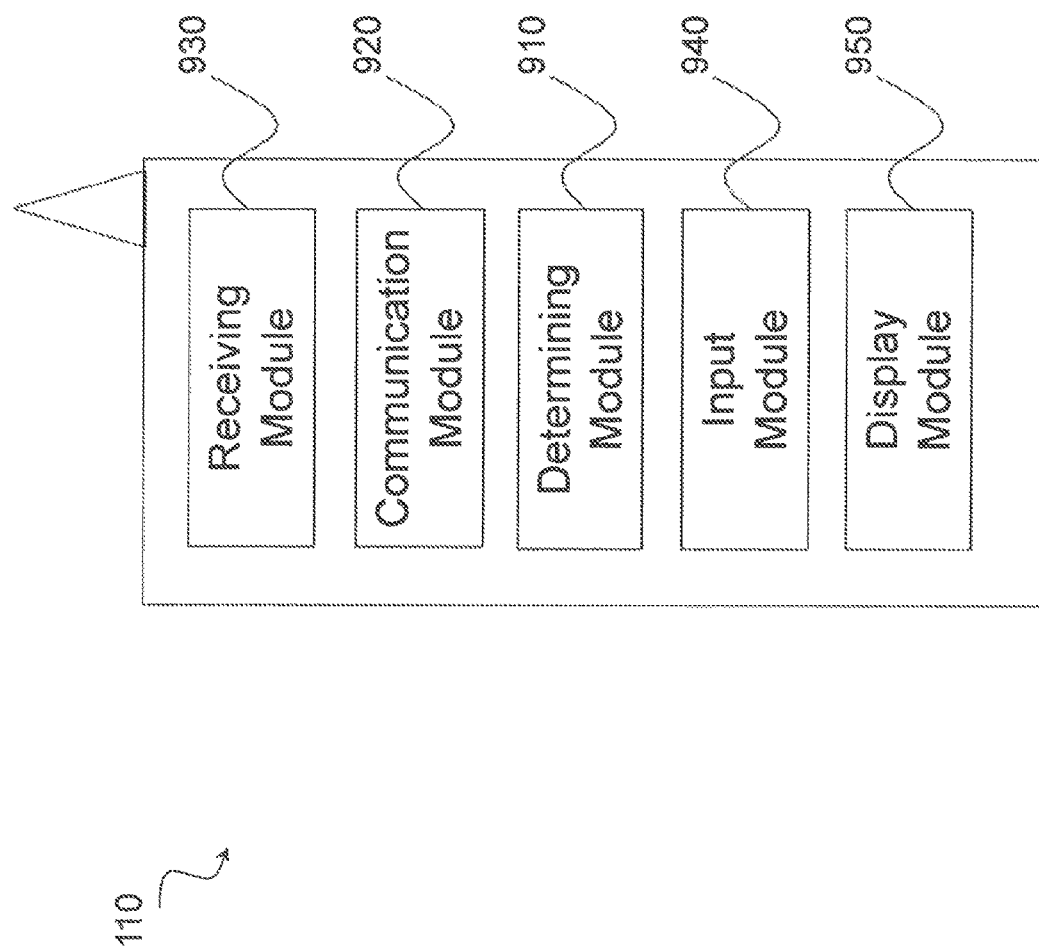
FIG. 9 is a block schematic of an exemplary wireless device, in accordance with certain embodiments.

FIG. 9 is a schematic block diagram of an exemplary wireless device, in accordance with certain embodiments. Wireless device 110 may include one or more modules. For example, wireless device 110 may include a determining module 910, a communication module 920, a receiving module 930, an input module 940, a display module 950, and any other suitable modules. In some embodiments, one or more of determining module 910, communication module 920, receiving module 930, input module 940, display module 950, or any other suitable module may be implemented using one or more processors, such as processing circuitry 620 described above in relation to FIG. 6. In certain embodiments, the functions of two or more of the various modules may be combined into a single module. Wireless device 110 may perform the methods for paging described above in relation to FIGS. 1-5.

Determining module 910 may perform the processing functions of wireless device 110. For example, determining module 910 may determine whether the received paging indicator matches an identifier associated with the wireless device (e.g., a UE). As another example, determining module 910 may compare the received one or more paging identities with a paging identity associated with the wireless device. As still another example, determining module 910 may determine that at least a portion of the DL data is intended for the wireless device. As yet another example, determining module 910 may process the at least a portion of the DL data. As another example, determining module 910 may determine, based on the comparison of the received one or more paging identities with the paging identity associated with the wireless device, that the wireless device is being paged. As another example, determining module 910 may configure a minimum length of a received paging indicator that the wireless device should accept and use in comparing the received one or more paging identities with the paging identity associated with the wireless device.

Determining module 910 may include or be included in one or more processors such as processing circuitry 620 described above in relation to FIG. 6. Determining module 910 may include analog and/or digital circuitry configured to perform any of the functions of determining module 910 and/or processing circuitry 620 described above. The functions of determining module 910 described above may, in certain embodiments, be performed in one or more distinct modules.

Communication module 920 may perform the transmission functions of wireless device 110. For example, communication module 920 may, upon determining that the received paging indicator matches the identifier associated with the wireless device, transmit a predefined UL signal to the network node. As another example, communication module 920 may send, to the network node, an UL message in response to the page. As another example, communication module 920 may send, to the network node, the paging identity uniquely associated with the UE to enable the network node to compare the paging identity uniquely associated with the UE to a list of paging identities of one or more UEs to be paged. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. For example, receiving module 930 may receive a paging indicator from a network node. As another example, receiving module 930 may receive a DL message for initiating an exchange and verification of one or more paging identities (e.g., a DL message comprising one or more paging identities and/or an UL grant), wherein each of the one or more paging identities is uniquely associated with one of a plurality of UEs. Receiving module 930 may include a receiver and/or a transceiver. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910. The functions of receiving module 930 described above may, in certain embodiments, be performed in one or more distinct modules.

Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910. The functions of input module 940 described above may, in certain embodiments, be performed in one or more distinct modules.

Display module 950 may present signals on a display of wireless device 110. Display module 950 may include the display and/or any appropriate circuitry and hardware configured to present signals on the display. Display module 950 may receive signals to present on the display from determining module 910. The functions of display module 950 described above may, in certain embodiments, be performed in one or more distinct modules.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

FIG. 10 is a schematic block diagram of an exemplary network node 115, in accordance with certain embodiments. Network node 115 may include one or more modules. For example, network node 115 may include determining module 1010, communication module 1020, receiving module 1030, and any other suitable modules. In some embodiments, one or more of determining module 1010, communication module 1020, receiving module 1030, or any other suitable module may be implemented using one or more processors, such as processing circuitry 720 described above in relation to FIG. 7. In certain embodiments, the functions of two or more of the various modules may be combined into a single module. Network node 115 may perform the methods for paging described above with respect to FIGS. 1-5.

Determining module 1010 may perform the processing functions of network node 115. For example, determining module 1010 may determine to page one or more wireless devices (e.g. UEs). As another example, determining module 1010 may allocate a paging indicator to the one or more wireless device s prior to determining to page the one or more wireless devices. As another example, determining module 1010 may determine one or more directions from which a predefined UL signal was received from the at least one of the one or more wireless devices, and distribute transmitted power in the determined one or more directions. As still another example, determining module 1010 may determine whether to transmit DL data for the first wireless device in the DL message based on a traffic load in a cell where the DL message will be transmitted. As yet another example, determining module 1010 may determine whether to transmit the paging indicator to the one or more wireless devices based on one or more of: a capability of the one or more wireless devices; a category of the one or more wireless devices; and information related to subscription data associated with the one or more wireless devices. As another example, determining module 1010 may configure at least one of the one or more wireless devices with a minimum length of a received paging indicator that the wireless device should accept as an indication that the wireless device is one of the one or more wireless devices targeted by the paging indicator. As another example, determining module 1010 may compare a received paging identity of a UE to a list of paging identities of one or more UEs to be paged.

Determining module 1010 may include or be included in one or more processors, such as processing circuitry 720 described above in relation to FIG. 7. Determining module 1010 may include analog and/or digital circuitry configured to perform any of the functions of determining module 1010 and/or processing circuity 720 described above. The functions of determining module 1010 may, in certain embodiments, be performed in one or more distinct modules.

Communication module 1020 may perform the transmission functions of network node 115. For example, communication module 1020 may transmit a paging indicator associated with the one or more wireless devices. As another example, communication module 1020 may transmit multiple transmissions of the paging indicator (in certain embodiments, in different directions and/or with transmitted power distributed in one or more directions). The multiple transmissions by communication module 1020 may be beamformed. As another example, communication module 1020 may send, in response to the received predefined UL signal, a DL message for initiating an exchange and verification of one or more paging identities (e.g., a DL message including one or more paging identities and/or an UL grant), wherein each of the one or more paging identities is uniquely associated with one of the one or more wireless devices. As another example, communication module 1020 may send an allocated paging indicator to one or more wireless devices.

Communication module 1020 may transmit messages to one or more of wireless devices 110. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010 or any other module. The functions of communication module 1020 may, in certain embodiments, be performed in one or more distinct modules.

Receiving module 1030 may perform the receiving functions of network node 115. For example, receiving module 1030 may receive, in response to the transmitted paging indicator, a predefined UL signal from at least one of the one or more wireless devices. As another example, receiving module 1030 may receive, from another network node, a request to page the one or more wireless devices. As still another example, receiving module 1030 may receive a paging identity from a UE. Receiving module 1030 may receive any suitable information from a wireless device. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010 or any other suitable module. The functions of receiving module 1030 may, in certain embodiments, be performed in one or more distinct modules.

Determining module 1010, communication module 1020, and receiving module 1030 may include any suitable configuration of hardware and/or software. Network node 115 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP $3^{rd}$ Generation Partnership Project
5G $5^{th}$ Generation
ACK Acknowledgement
AP Access Point
ASIC Application Specific Integrated Circuit
BS Base Station
BSC Base Station Controller
BTS Base Transceiver Station
CD Compact Disk
CP Cyclic Prefix
CPE Customer Premises Equipment
CPU Central Processing Unit CRC Cyclic Redundancy Check
D2D Device-to-device
DAS Distributed Antenna System
DL Downlink
DRX Discontinuous Reception
DVD Digital Video Disk
eNB evolved Node B
EPC Evolved Packet Core
EPS Evolved Packet System
E-SMLC Evolved Serving Mobile Location Center
E-UTRAN Evolved Universal Terrestrial Radio Access Network
FPGA Field Programmable Gate Array
gNB The NR term corresponding to the term eNB in LTE
GPRS General Packet Radio Service
GPS Global Positioning System
HF High Frequency
IoT Internet of Things
IP Internet Protocol
IMS IP Multimedia Subsystem
International Mobile Subscriber Identity
LAN Local Arta Network
LEE Laptop Embedded Equipment
LME Laptop Mounted Equipment
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MIMO Multiple Input Multiple Output
MME Mobility Management Entity
MSC Mobile Switching Center
MSG Message
MSR Multi-standard Radio
MTC Machine-Type Communication
NACK Negative Acknowledgement
NAS Non Access Stratum
NB-IoT Narrow band Internet of Things
NGC Next Generation Core
NR New Radio
O&M Operations and Management
OS Operating System
OSS Operations Support System
PCC Policy Control and Charging
PDCCH Physical Downlink Control Channel
PDSCH Physical Downlink Shared Channel
PRACH Physical Random Access Channel
P-RNTI Paging Radio Network Temporary Identifier
PSTN Public Switched Telephone Network
RAM Random Access Memory
RAN Radio Access Network
RAR Random Access Response
RAT Radio Access Technology
RLC Radio Link Control
RNC Radio Network Controller
RNTI Radio Network Temporary Identifier
ROM Read-Only Memory
RRC Radio Resource Control
RRH Remote Radio Head
RRU Remote Radio Unit
S1 The interface between the RAN and the EPC in EPS/LTE. Various versions or variants of it may also be used to connect NR to NGC, E-UTRAN to NGC (but less likely NR to EPC). In EPS/LTE the S1 interface consists of one interface for the user plane, S1-U, between an eNB and a SGW, and one interface for the control plane, S1-MME, between an eNB and a MME.
S1-MME The control plane part of the S1 interface in EPS/LTE (i.e., the interface between an eNB and a MME).
S1-U The user plane part of the S1 interface in EPS/LTE (i.e., the interface between an eNB and a SGW).
SAE System Architecture Evolution
SFN Single Frequency Network
SGW Serving Gateway
SON Self-Organizing Network
S-TMSI SAE Temporary Mobile Subscriber Identity
TDD Time Division Duplex
TR Technical Report
TRP Transmission/Reception Point
TS Technical Specification
TX Transmission/Transmit
UE User Equipment
UL Uplink
WAN Wide Area Network
WLAN Wireless Local Area Network

The invention claimed is:

1. A method in a network node, comprising:
determining to page one or more user equipments (UEs);
transmitting a paging indicator associated with the one or more UEs, wherein at least one of the one or more UEs is configured with a minimum length of the paging indicator that the UE should accept;
receiving, in response to the transmitted paging indicator, a predefined uplink signal from the at least one of the one or more UEs;
sending, in response to the received predefined uplink signal, a downlink message for initiating an exchange and verification of one or more paging identities, wherein each of the one or more paging identities is uniquely associated with one of the one or more UEs; and
receiving, in response to determining that a paging identity associated with the UE matches one of the one or more paging identities, an uplink message from the UE, wherein the minimum length paging indicator is used in comparing the paging identity with the one of the one or more paging identities.

2. The network node of claim 1, wherein the downlink message for initiating the exchange and verification of one or more paging identities comprises an uplink grant enabling a first UE of the one or more UEs to provide a first paging identity uniquely associated with the first UE.

3. The network node of claim 2, wherein the processing circuitry is further configured to:
receive, via the receiver, the first paging identity from the first UE; and
compare the received first paging identity to a list of paging identities of one or more UEs to be paged.

4. A method in a user equipment (UE), comprising:
receiving a paging indicator from a network node, wherein at least one of the one or more UEs is configured with a minimum length of the paging indicator that the UE should accept;
determining whether the received paging indicator matches an identifier associated with the UE;
upon determining that the received paging indicator matches the identifier associated with the UE, transmitting a predefined uplink signal to the network node;
receiving a downlink message for initiating an exchange and verification of one or more paging identities, wherein each of the one or more paging identities is uniquely associated with one of a plurality of UEs;

comparing the one or more paging identities with a paging identity associated with the UE using the minimum length paging indicator; and sending an uplink message to the network node in response to determining that the paging identity associated with the UE matches one of the one or more paging identities.

5. A network node, comprising:
a receiver;
a transmitter; and
processing circuitry coupled to the receiver and the transmitter, the processing circuitry configured to:
determine to page one or more user equipments (UEs);
transmit, via the transmitter, a paging indicator associated with the one or more UEs, wherein at least one of the one or more UEs is configured with a minimum length of the paging indicator that the UE should accept;
receive, via the receiver, in response to the transmitted paging indicator, a predefined uplink signal from the at least one of the one or more UEs;
send, via the transmitter, in response to the received predefined uplink signal, a downlink message for initiating an exchange and verification of one or more paging identities, wherein each of the one or more paging identities is uniquely associated with one of the one or more UEs; and
receive, in response to determining that a paging identity associated with the UE matches one of the one or more paging identities, an uplink message from the UE, wherein the minimum length paging indicator is used in comparing the paging identity with the one of the one or more paging identities.

6. The network node of claim 5, wherein the downlink message for initiating the exchange and verification of one or more paging identities comprises the one or more paging identities.

7. The network node of claim 5, wherein the processing circuitry is further configured to allocate the paging indicator to the one or more UEs prior to determining to page the one or more UEs.

8. The network node of claim 5, wherein the paging indicator comprises a set of bits that is the same as a subset of bits of each of the one or more paging identities uniquely associated with one of the one or more UEs.

9. The network node according to claim 8, wherein the paging indicator further comprises a field indicating one or more of:
a length of the paging indicator; and
a format of the paging indicator.

10. The network node of claim 5, wherein the processing circuitry configured to send, via the transmitter, the downlink message comprises processing circuitry configured to:
determining one or more directions from which the predefined uplink signal was received from the at least one of the one or more UEs; and
distributing transmitted power in the determined one or more directions.

11. The network node of claim 5, wherein the processing circuitry configured to transmit, via the transmitter, the paging indicator comprises processing circuitry configured to transmit, via the transmitter, multiple transmissions of the paging indicator.

12. The network node of claim 11, wherein each of the multiple transmissions is transmitted in a different direction.

13. A user equipment (UE), comprising:
a receiver;
a transmitter; and
processing circuitry coupled to the receiver and the transmitter, the processing circuitry configured to:
receive, via the receiver, a paging indicator from a network node, wherein at least one of the one or more UEs is configured with a minimum length of the paging indicator that the UE should accept;
determine whether the received paging indicator matches an identifier associated with the UE;
upon determining that the received paging indicator matches the identifier associated with the UE, transmit, via the transmitter, a predefined uplink signal to the network node;
receive, via the receiver, a downlink message for initiating an exchange and verification of one or more paging identities, wherein each of the one or more paging identities is uniquely associated with one of a plurality of UEs;
compare the one or more paging identities with a paging identity associated with the UE using the minimum length paging indicator; and
send an uplink message to the network node in response to determining that the paging identity associated with the UE matches one of the one or more paging identities.

14. The UE of claim 13, wherein the downlink message for initiating the exchange and verification of one or more paging identities comprises the one or more paging identities.

15. The UE of claim 14, wherein the processing circuitry is further configured to compare the received one or more paging identities with a paging identity associated with the UE.

16. The UE of claim 15, further comprising:
determining, based on the comparison of the received one or more paging identities with the paging identity associated with the UE, that the UE is being paged.

17. The UE of claim 16, further comprising sending, to the network node, an uplink message in response to the page.

18. The UE of claim 13, wherein the downlink message for initiating the exchange and verification of one or more paging identities comprises an uplink grant enabling the UE to send a paging identity uniquely associated with the UE to the network node.

19. The UE of claim 18, wherein the processing circuitry is further configured to:
send, to the network node via the transmitter, the paging identity uniquely associated with the UE to enable the network node to compare the paging identity uniquely associated with the UE to a list of paging identities of one or more UEs to be paged.

20. The UE of claim 13, wherein the identifier associated with the UE comprises a paging indicator allocated to the UE before receiving the paging indicator.

21. The UE of claim 13, wherein the identifier associated with the UE is a subset of bits of the paging identity associated with the UE.

22. The UE of claim 21, wherein the paging indicator further comprises a field indicating one or more of:
a length of the paging indicator; and
a format of the paging indicator.

23. The UE of claim 13, wherein the predefined uplink signal is a Physical Random Access Channel (PRACH) preamble.

24. The UE of claim 13, wherein the downlink message further comprises downlink data intended for one or more of:

the UE; and
another UE of the plurality of UEs associated with the one or more paging identities in the downlink message.

25. The UE of claim 24, wherein the processing circuitry is further configured to:
determine that at least a portion of the downlink data is intended for the UE; and
process the at least a portion of the downlink data.

* * * * *